(12) United States Patent
Hadwen et al.

(10) Patent No.: US 10,807,091 B2
(45) Date of Patent: Oct. 20, 2020

(54) METHOD OF DRIVING AN ACTIVE MATRIX ELECTRO-WETTING ON DIELECTRIC DEVICE AND AN ACTIVE MATRIX ELECTRO-WETTING ON DIELECTRIC DEVICE

(71) Applicant: Sharp Life Science (EU) Limited, Oxford (GB)

(72) Inventors: Benjamin James Hadwen, Oxford (GB); Jonathan Buse, Oxford (GB)

(73) Assignee: Sharp Life Science (EU) Limited, Oxford (GB)

( * ) Notice: Subject to any disclaimer, the term of this patent is extended or adjusted under 35 U.S.C. 154(b) by 741 days.

(21) Appl. No.: 15/527,829

(22) PCT Filed: Dec. 10, 2015

(86) PCT No.: PCT/JP2015/006176
§ 371 (c)(1),
(2) Date: May 18, 2017

(87) PCT Pub. No.: WO2016/110901
PCT Pub. Date: Jul. 14, 2016

(65) Prior Publication Data
US 2018/0078934 A1    Mar. 22, 2018

(30) Foreign Application Priority Data

Jan. 8, 2015 (GB) .................................. 1500260.3

(51) Int. Cl.
*B01L 3/00* (2006.01)
*G02B 26/00* (2006.01)
(Continued)

(52) U.S. Cl.
CPC ..... *B01L 3/50273* (2013.01); *B01L 3/502792* (2013.01); *C25B 9/06* (2013.01);
(Continued)

(58) Field of Classification Search
CPC .......... B01L 3/50273; B01L 3/502792; B01L 2300/0819; B01L 2200/143;
(Continued)

(56) References Cited

U.S. PATENT DOCUMENTS 8,173,000 B1 * 5/2012 Hadwen .............. B01L 3/50273
204/450
8,221,605 B2 * 7/2012 Pollack ............... B01F 11/0071
204/600

(Continued)

FOREIGN PATENT DOCUMENTS

EP          2759342        7/2014
JP     2009-271142 A     11/2009
(Continued)

OTHER PUBLICATIONS

Extended European Search Report of EP 15876781 dated Nov. 15, 2017.

(Continued)

*Primary Examiner* — Luan V Van
*Assistant Examiner* — Joshua L Allen
(74) *Attorney, Agent, or Firm* — Renner, Otto, Boisselle & Sklar, LLP

(57) ABSTRACT

A method of driving an active matrix electro-wetting on dielectric (AM-EWOD) device comprises (i) setting a reference electrode to a first reference voltage; (ii) writing a set of data to array element electrodes of array elements of the device; and (iii) either (a) maintaining the voltages written to the array element electrodes until a time $t_0$ or (b) re-writing the set of data N–1 times (where N≥2). The reference electrode is then set to a second reference voltage different from the first reference voltage, and features (i) to (iii) are repeated. When the data are first written, there is a delay between the time when the voltage on the reference (Continued)

electrode is transitioned and the time when a given array element is next written with data. Feature (iii) allows the time for which the correct data values are held to be increased relative to the time for which incorrect data values may possibly be held, so that the time for which an element may be in an incorrect state can be made insignificant in terms of its effect on unwantedly perturbing droplet operations.

15 Claims, 20 Drawing Sheets

(51) Int. Cl.
*F04B 19/00* (2006.01)
*G09G 3/34* (2006.01)
*C25B 9/06* (2006.01)
*C25B 15/00* (2006.01)

(52) U.S. Cl.
CPC ............ *C25B 15/00* (2013.01); *F04B 19/006* (2013.01); *G02B 26/005* (2013.01); *G09G 3/348* (2013.01); *B01L 2200/143* (2013.01); *B01L 2300/0819* (2013.01); *B01L 2400/0427* (2013.01); *G09G 2310/0254* (2013.01)

(58) Field of Classification Search
CPC ........... B01L 2400/0427; B01L 3/5027; B01L 3/502715; G02B 26/005; F04B 19/006; G09G 3/348; G09G 2310/0254
See application file for complete search history.

(56) References Cited

U.S. PATENT DOCUMENTS 9,293,088 B2 * 3/2016 Yoshida ............... G09G 3/2022
2007/0075941 A1 * 4/2007 Zhou .................... G09G 3/3433
                                                    345/84
2011/0025668 A1 * 2/2011 Huitema .............. G09G 3/3433
                                                    345/211
2012/0006684 A1 * 1/2012 Hadwen ................ G09G 3/348
                                                    204/600
2012/0007608 A1 * 1/2012 Hadwen .............. B01L 3/50273
                                                    324/649
2013/0271153 A1 * 10/2013 Hadwen ........... G01N 27/44791
                                                    324/551
2014/0139507 A1 * 5/2014 Jung ...................... G09G 3/348
                                                    345/212
2014/0185126 A1 * 7/2014 Liang .................... G09G 3/348
                                                    359/290
2014/0202863 A1 * 7/2014 Hadwen ................ C25B 15/00
                                                    204/547
2015/0179097 A1 * 6/2015 Derckx ................. G09G 3/348
                                                    345/212

FOREIGN PATENT DOCUMENTS

JP     2012-150098 A     8/2012
JP     2012-230105 A    11/2012
JP     2013-238866 A    11/2013

OTHER PUBLICATIONS

Liang et al.: "A Decoupling Driving Scheme for Low Voltage Stress in Driving a Large-area High-resolution Electrowetting Display", SID Symposium Digest of Technical Papers, vol. 40, No. 1, pp. 375-378 (2009).

International Search Report and Written Opinion for corresponding International application No. PCT/JP15/006176, dated Apr. 12, 2016.

* cited by examiner

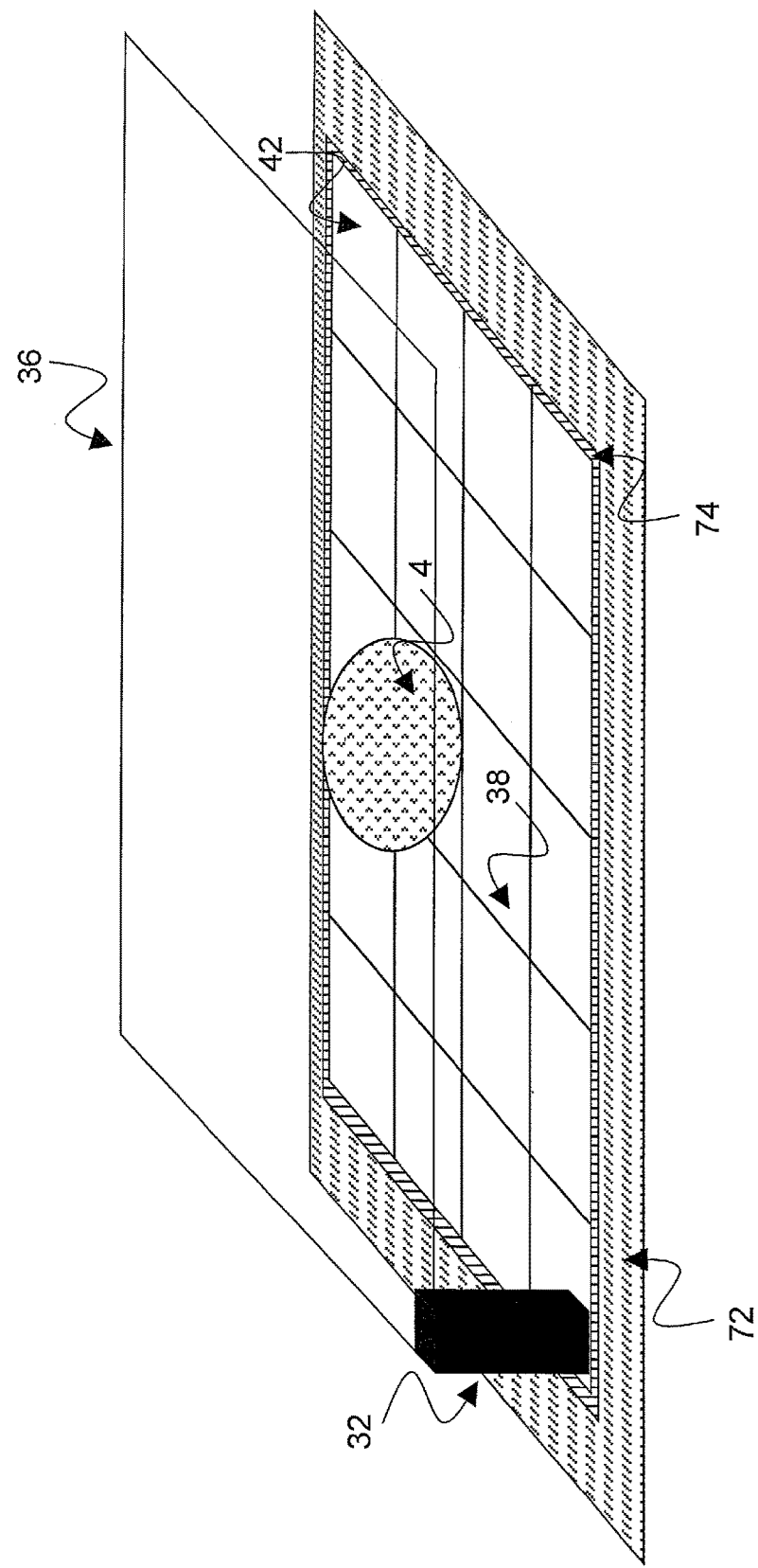
Figure 3: First embodiment

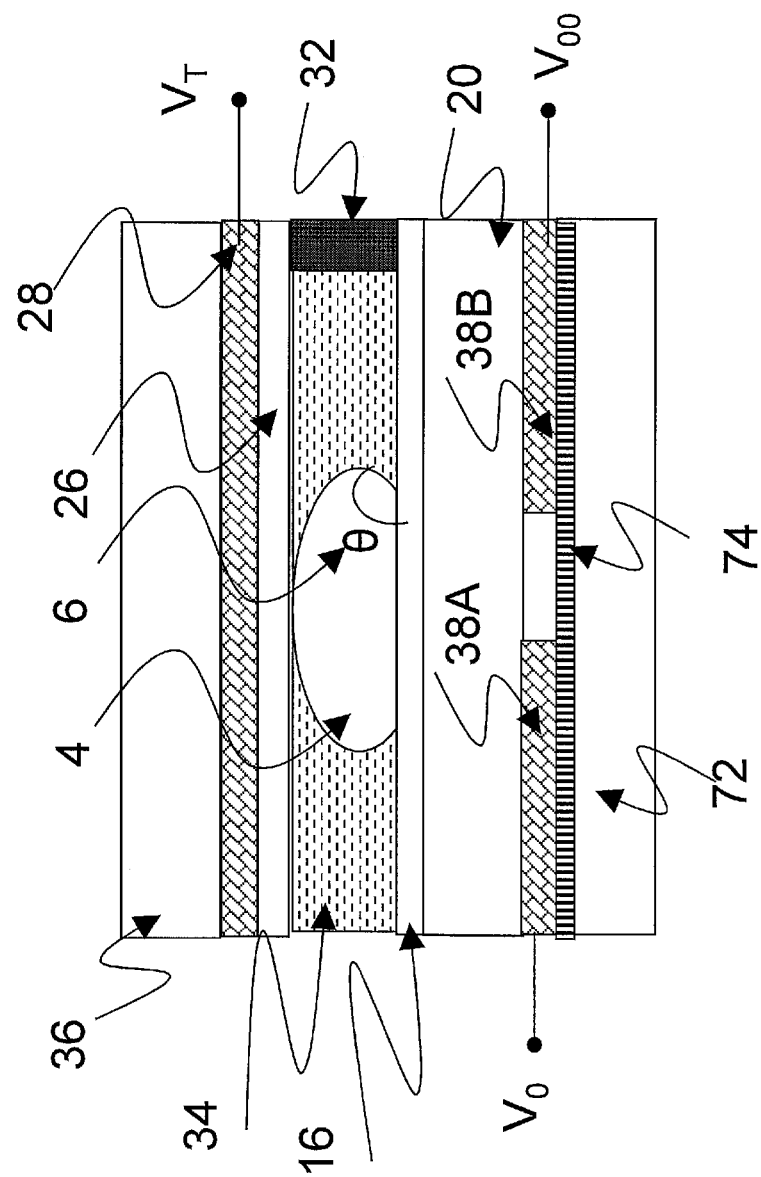
Figure 4: First embodiment

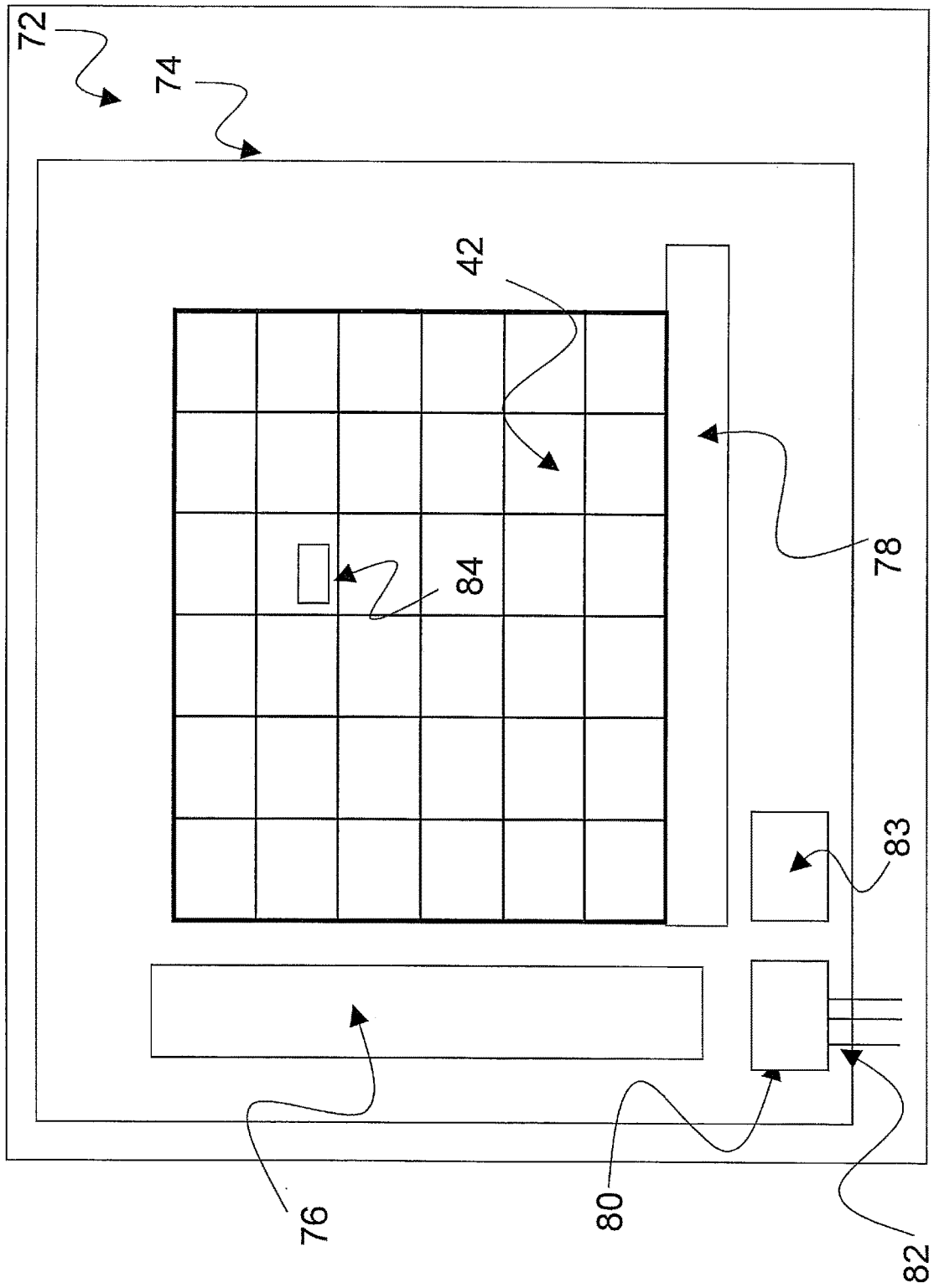

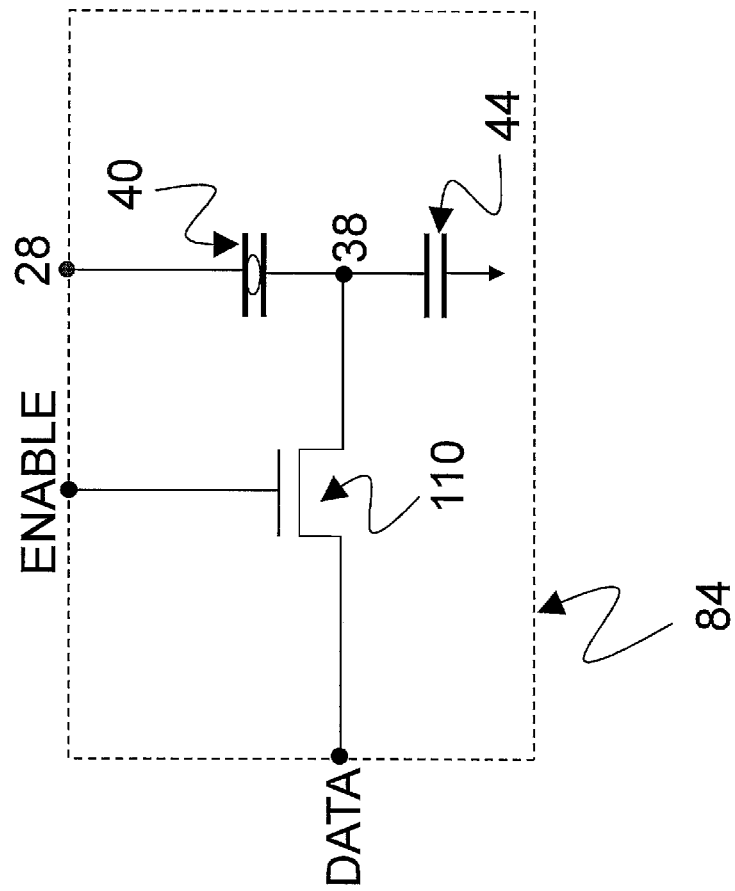
Figure 6: First embodiment

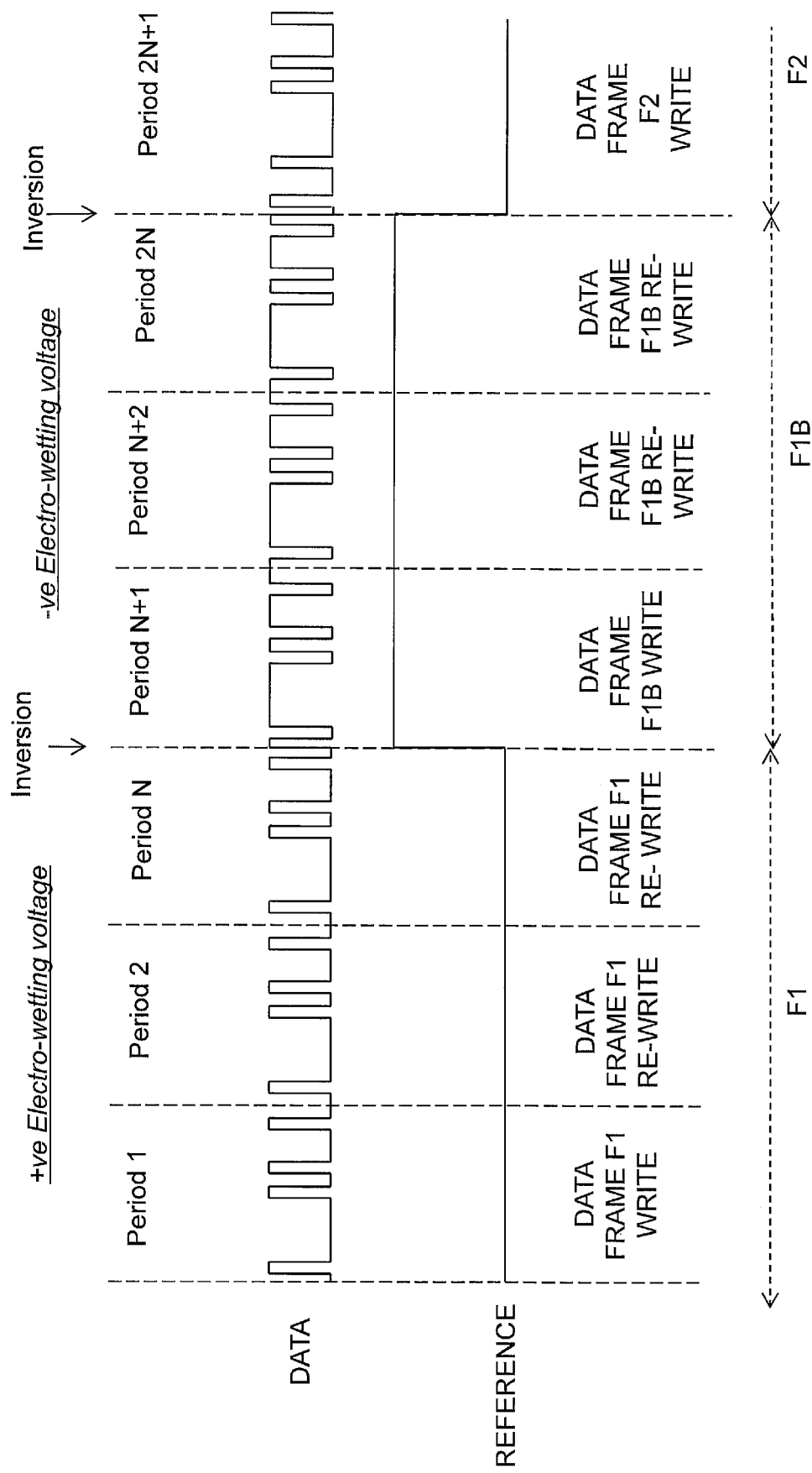
Figure 7: First embodiment

First embodiment

Figure 8A

Frame F1 (written N times)

| 1 | 0 | 0 | 1 | 1 |
|---|---|---|---|---|
| 1 | 1 | 1 | 0 | 0 |
| 0 | 0 | 0 | 0 | 0 |
| 0 | 0 | 0 | 0 | 0 |
| 0 | 0 | 0 | 0 | 0 |

TOP = $-V_{EW}$

Figure 8B

Frame F1B (written N times)

| 0 | 1 | 1 | 0 | 1 |
|---|---|---|---|---|
| 0 | 1 | 1 | 1 | 1 |
| 1 | 1 | 1 | 1 | 1 |
| 1 | 1 | 1 | 1 | 1 |
| 1 | 1 | 1 | 1 | 1 |

TOP = $+V_{EW}$

Figure 8C

Frame F2 (written N times)

| 0 | 1 | 1 | 0 | 0 |
|---|---|---|---|---|
| 0 | 1 | 1 | 0 | 0 |
| 0 | 0 | 0 | 0 | 0 |
| 0 | 0 | 0 | 0 | 0 |
| 0 | 0 | 0 | 0 | 0 |

TOP = $-V_{EW}$

Figure 8D

Frame F2B (written N times)

| 1 | 0 | 0 | 1 | 1 |
|---|---|---|---|---|
| 1 | 0 | 0 | 1 | 1 |
| 1 | 1 | 1 | 1 | 1 |
| 1 | 1 | 1 | 1 | 1 |
| 1 | 1 | 1 | 1 | 1 |

TOP = $+V_{EW}$

Second embodiment

Figure 9A
Frame F1 (written N times)

| 1 | 0 | 1 | 0 | 0 |
|---|---|---|---|---|
| 1 | 0 | 1 | 0 | 0 |
| 0 | 0 | 0 | 0 | 0 |
| 0 | 0 | 0 | 0 | 0 |
| 0 | 0 | 0 | 0 | 0 |

TOP = $-V_{EW}$

Figure 9B
Frame F2B (written N times)

| 1 | 0 | 1 | 1 | 1 |
|---|---|---|---|---|
| 1 | 1 | 1 | 1 | 1 |
| 1 | 0 | 0 | 1 | 1 |
| 1 | 0 | 0 | 0 | 1 |
| 1 | 1 | 1 | 1 | 1 |

TOP = $+V_{EW}$

Figure 9C
Frame F3 (written N times)

| 0 | 0 | 1 | 0 | 0 |
|---|---|---|---|---|
| 0 | 0 | 0 | 0 | 0 |
| 0 | 0 | 1 | 1 | 0 |
| 0 | 0 | 1 | 1 | 0 |
| 0 | 0 | 0 | 0 | 0 |

TOP = $-V_{EW}$

Figure 9D
Frame F4B (written N times)

| 1 | 1 | 1 | 1 | 1 |
|---|---|---|---|---|
| 1 | 1 | 1 | 0 | 0 |
| 1 | 1 | 1 | 0 | 0 |
| 1 | 1 | 1 | 1 | 1 |
| 1 | 1 | 1 | 1 | 1 |

TOP = $+V_{EW}$

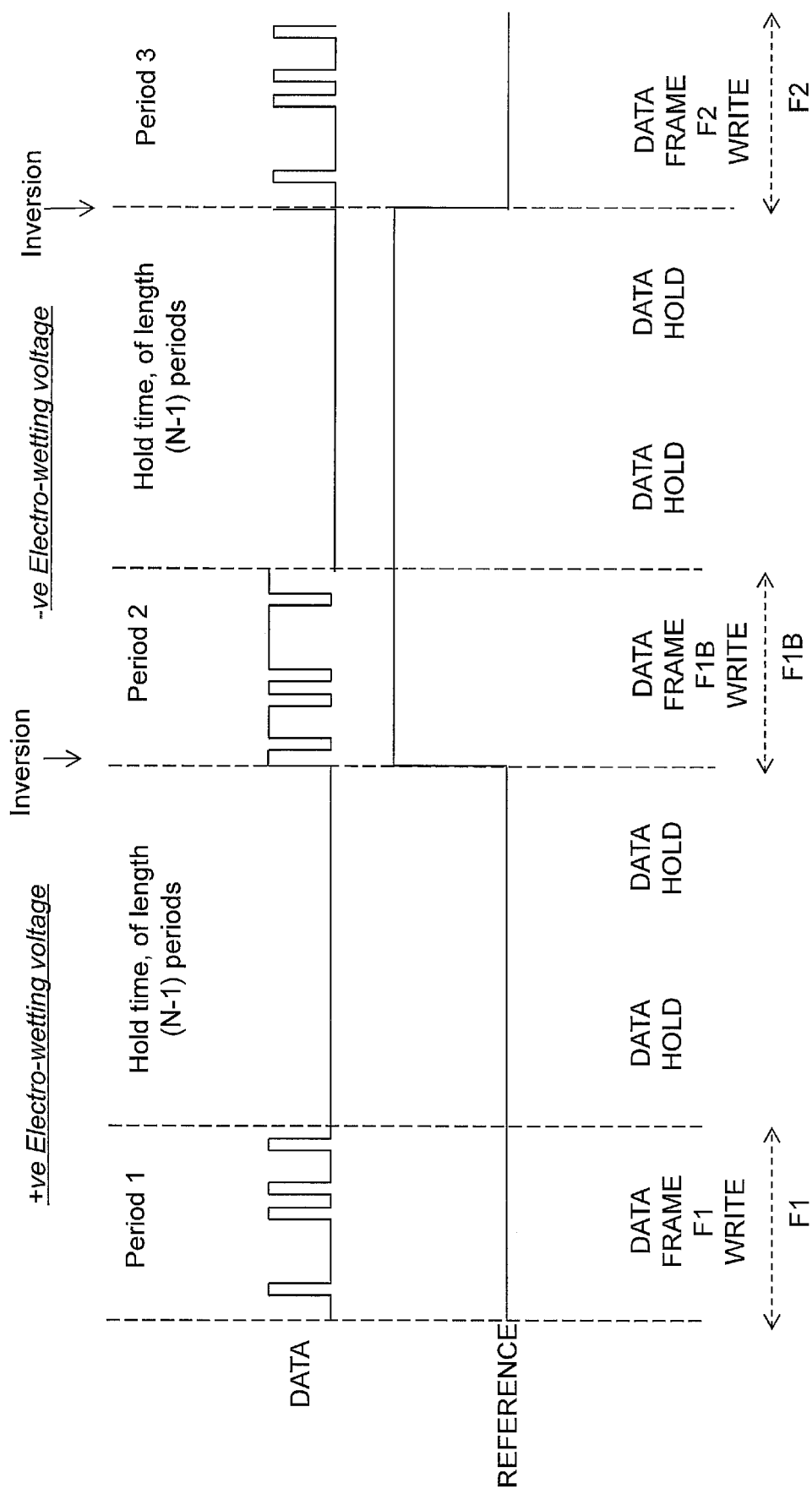
Figure 10: Third embodiment

Fourth embodiment

Figure 11A
Frame F1 (written N times)

|       | | | | | |
|-------|---|---|---|---|---|
| Row 5 | 0 | 0 | 1 | 1 | 0 |
| Row 4 | 0 | 0 | 1 | 1 | 0 |
| Row 3 | 0 | 0 | 0 | 0 | 0 |
| Row 2 | 0 | 0 | 0 | 0 | 0 |
| Row 1 | 0 | 0 | 0 | 0 | 0 |

TOP = $-V_{EW}$

Figure 11B
Frame F1B (written N times)

|       | | | | | |
|-------|---|---|---|---|---|
| Row 5 | 1 | 1 | 0 | 0 | 1 |
| Row 4 | 1 | 1 | 0 | 0 | 1 |
| Row 3 | 1 | 1 | 1 | 1 | 1 |
| Row 2 | 0 | 0 | 0 | 0 | 0 | Not written |
| Row 1 | 0 | 0 | 0 | 0 | 0 | Not written |

TOP = $+V_{EW}$

Figure 11C
Frame F2 (written N times)

|       | | | | | |
|-------|---|---|---|---|---|
| Row 5 | 0 | 0 | 0 | 0 | 0 |
| Row 4 | 0 | 0 | 1 | 1 | 0 |
| Row 3 | 0 | 0 | 1 | 1 | 0 |
| Row 2 | 0 | 0 | 0 | 0 | 0 | Not written |
| Row 1 | 0 | 0 | 0 | 0 | 0 | Not written |

TOP = $-V_{EW}$

Figure 11D
Frame F2B (written N times)

|       | | | | | |
|-------|---|---|---|---|---|
| Row 5 | 1 | 1 | 1 | 1 | 1 |
| Row 4 | 1 | 1 | 0 | 0 | 1 |
| Row 3 | 1 | 1 | 0 | 0 | 1 |
| Row 2 | 1 | 1 | 1 | 1 | 1 |
| Row 1 | 0 | 0 | 0 | 0 | 0 | Not written |

TOP = $+V_{EW}$

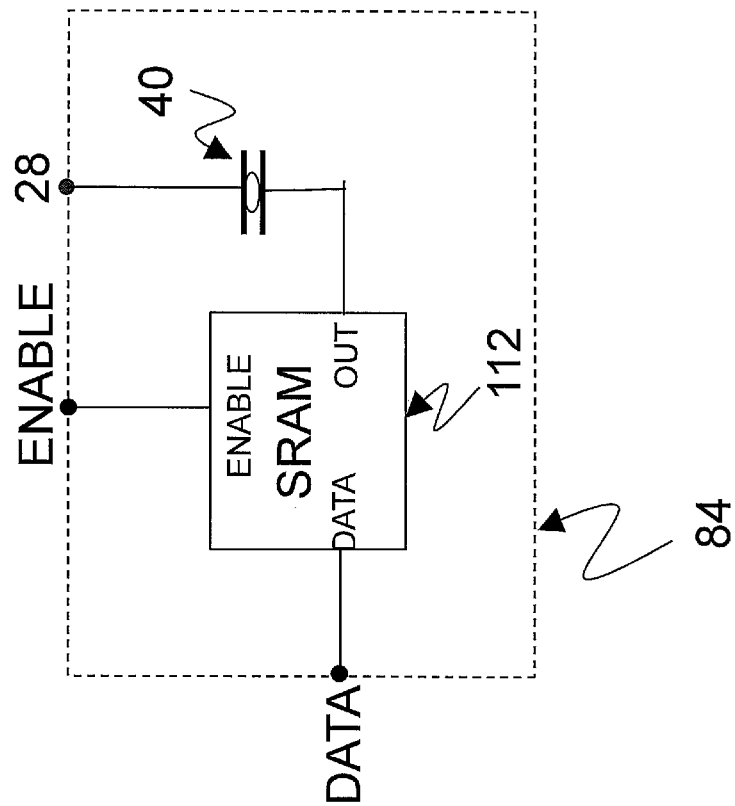
Figure 12: Fifth embodiment

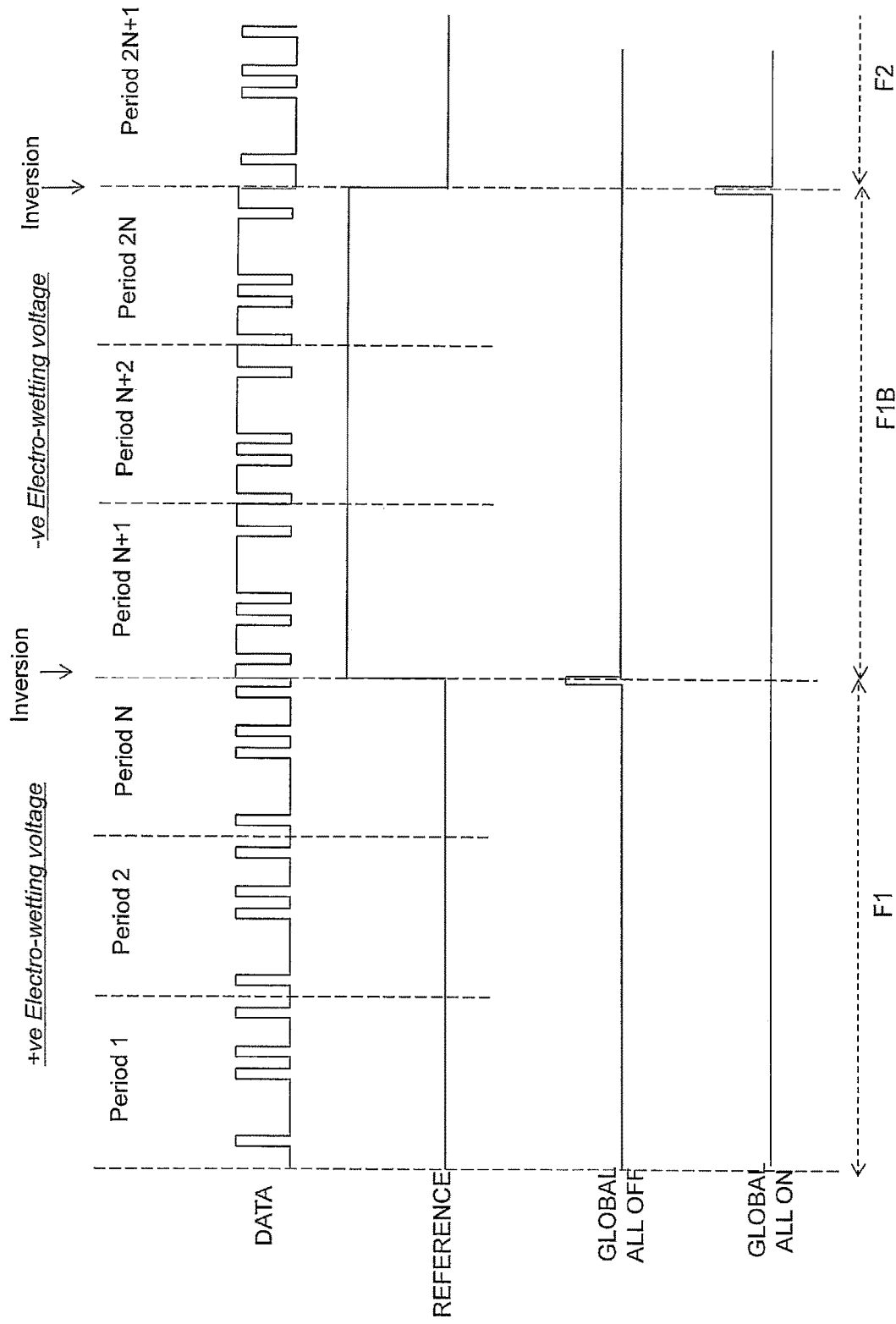
Figure 13: Sixth embodiment

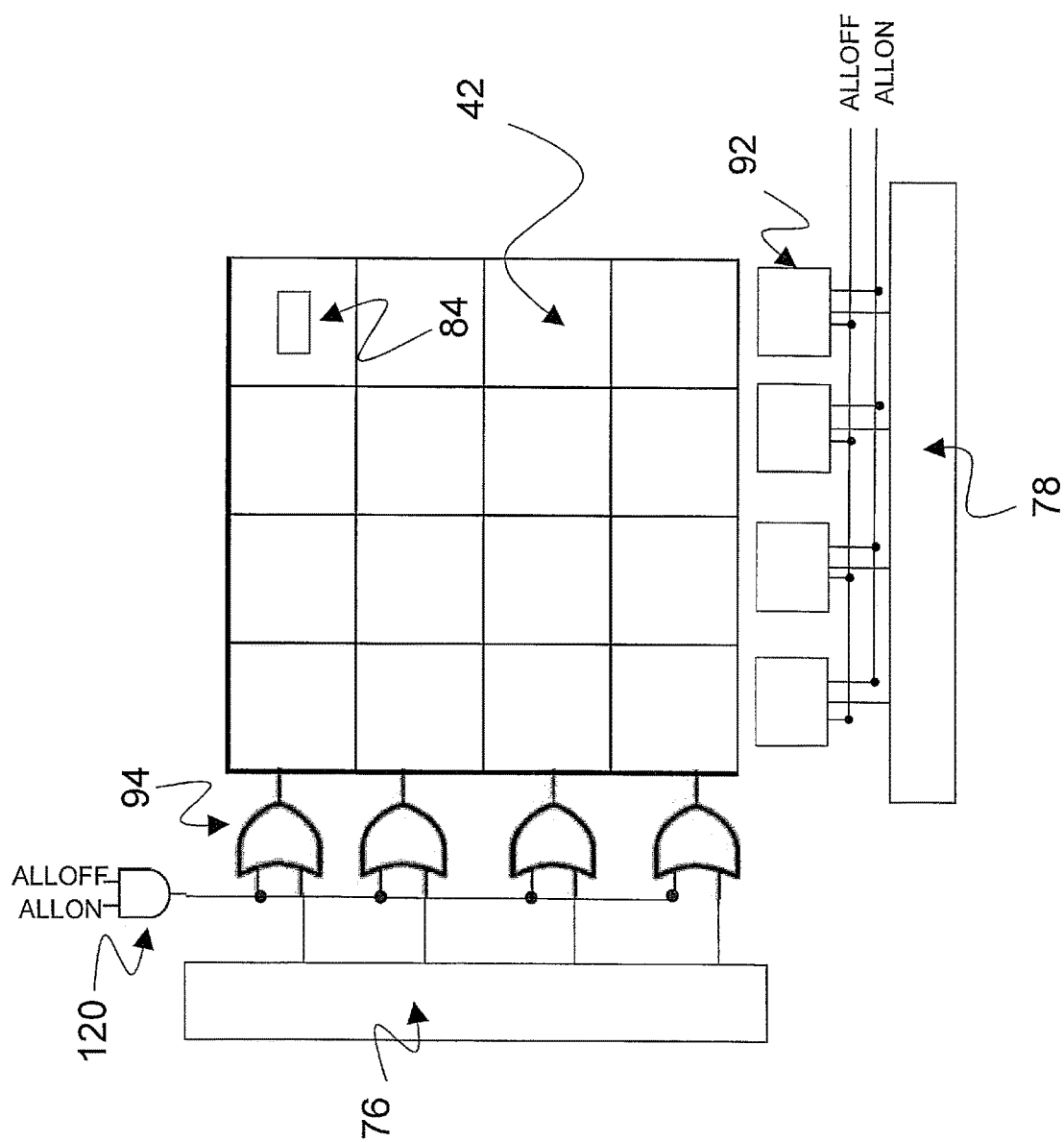
Figure 14: Sixth embodiment

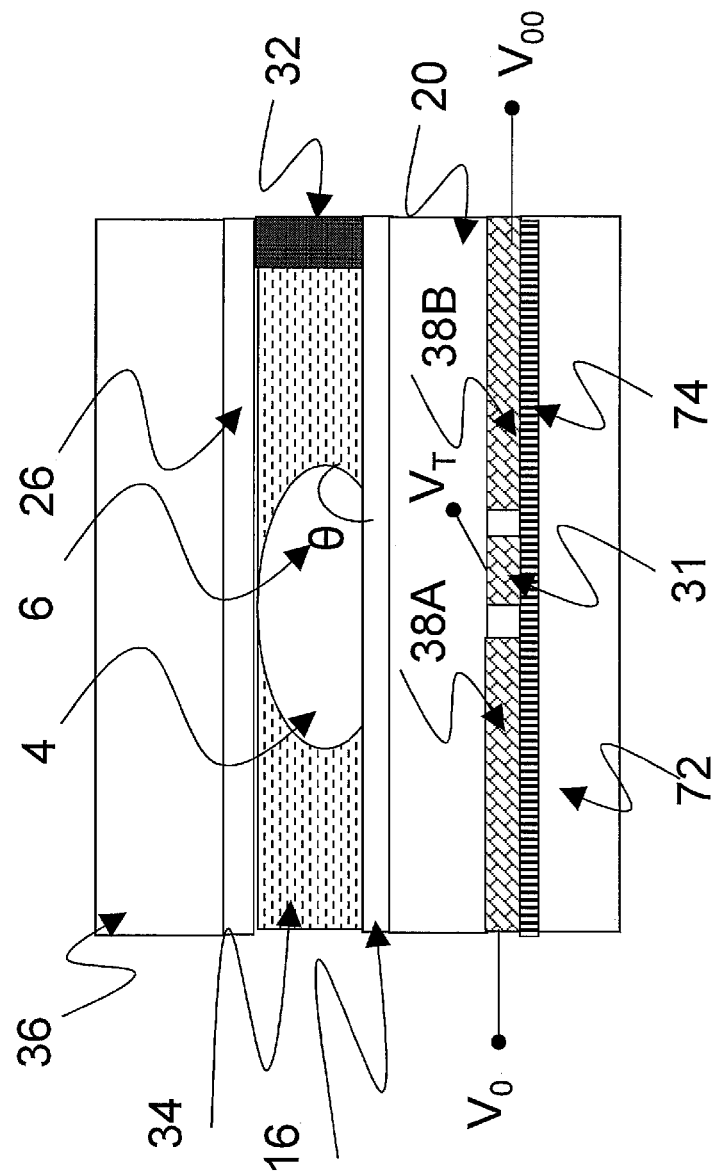
*Figure 15: Seventh embodiment*

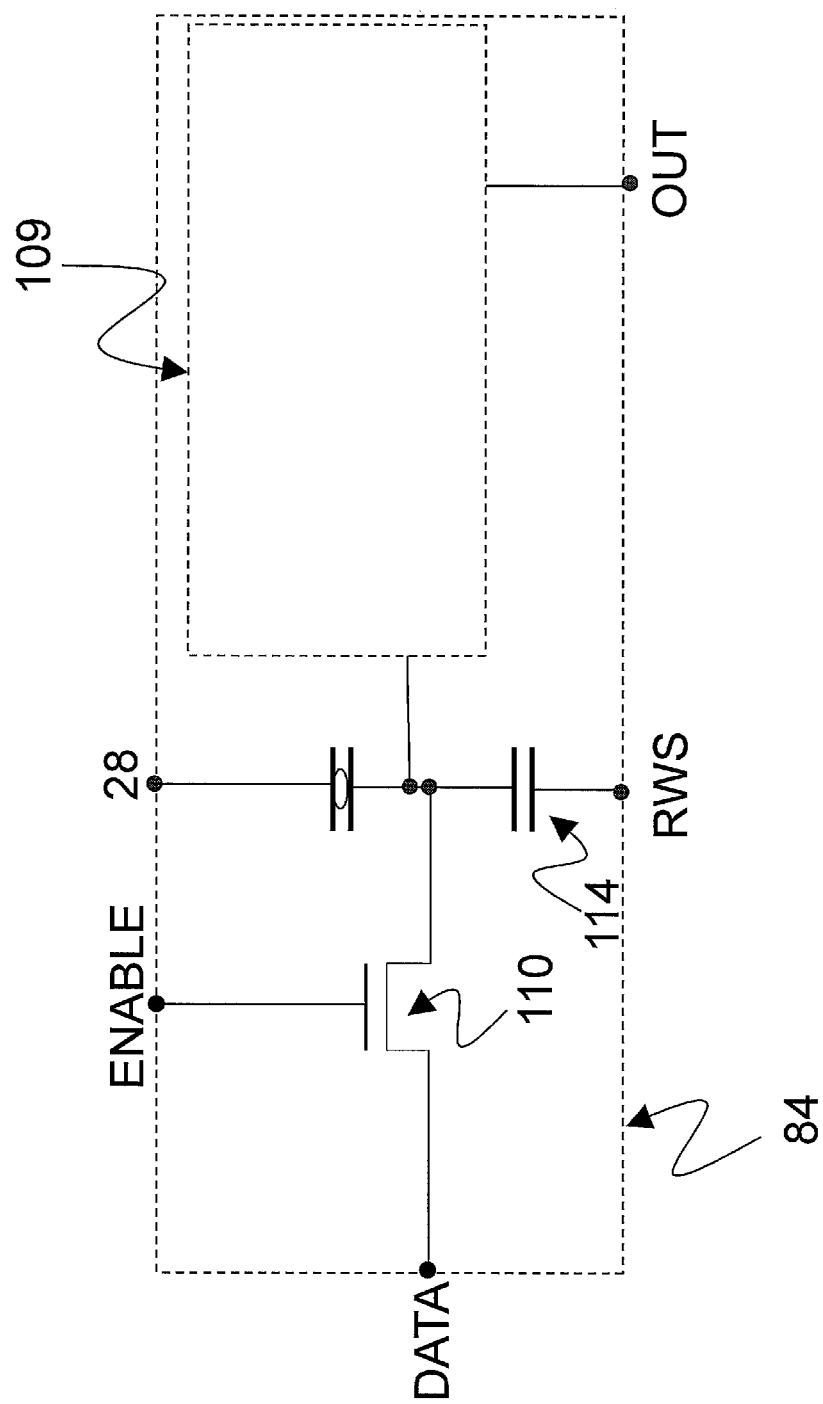
Figure 16: Eighth embodiment

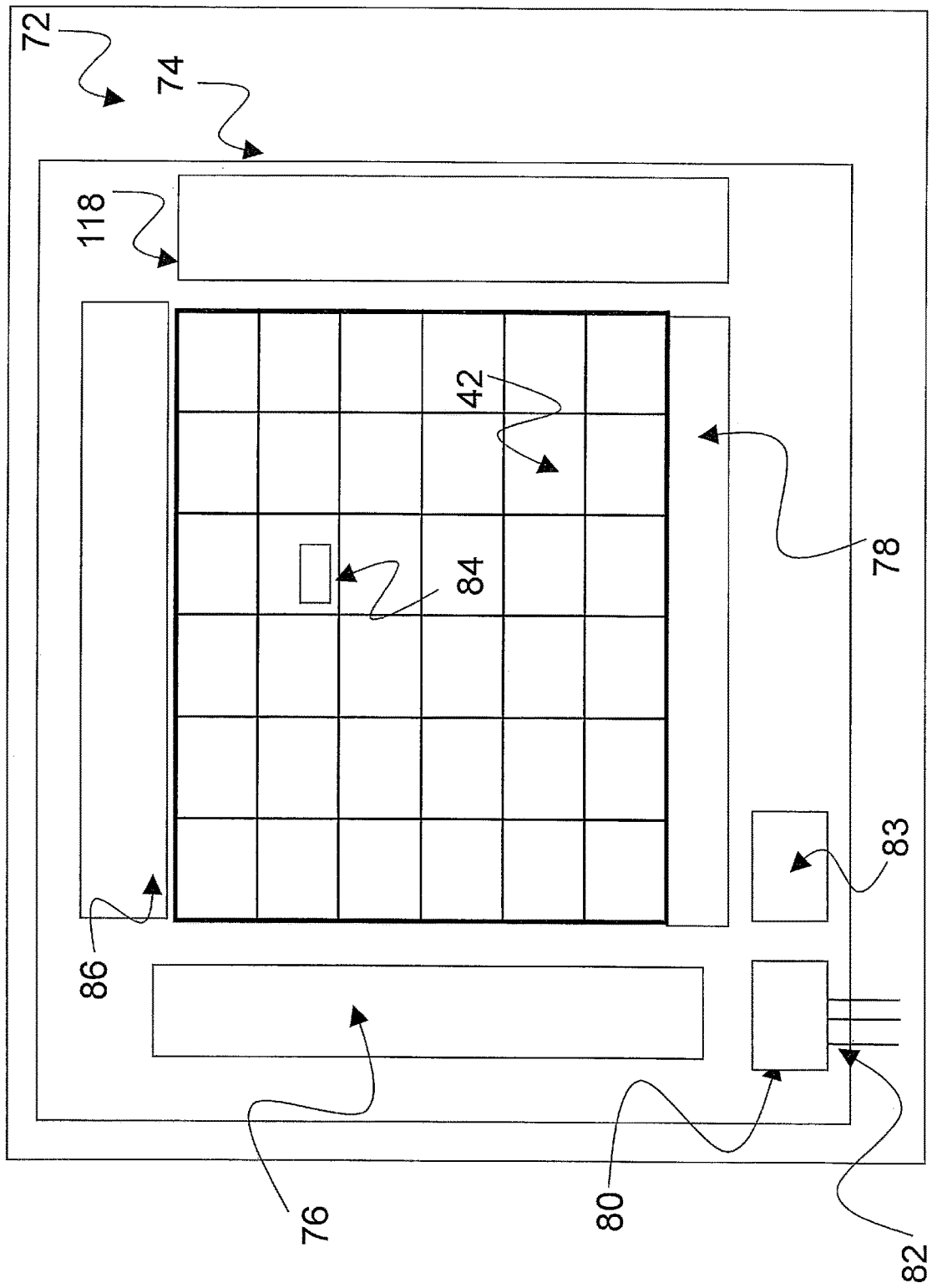
Figure 17: Eighth embodiment

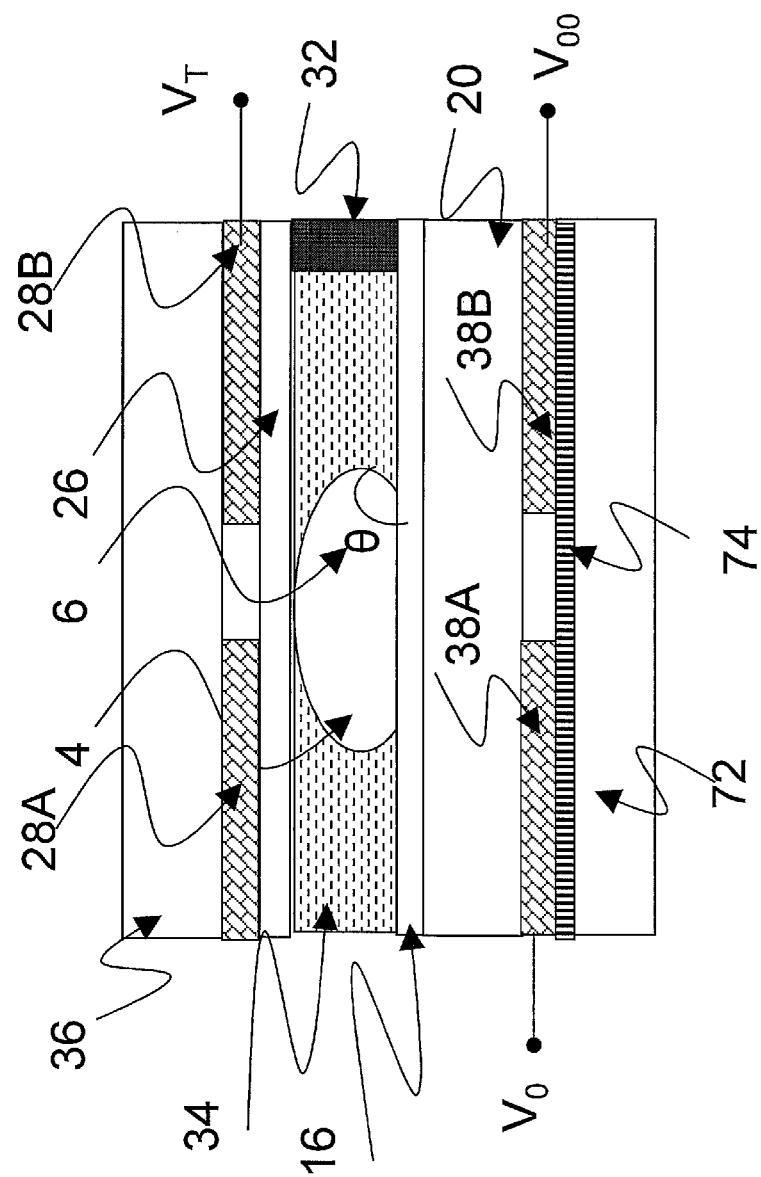
Figure 18: Ninth embodiment

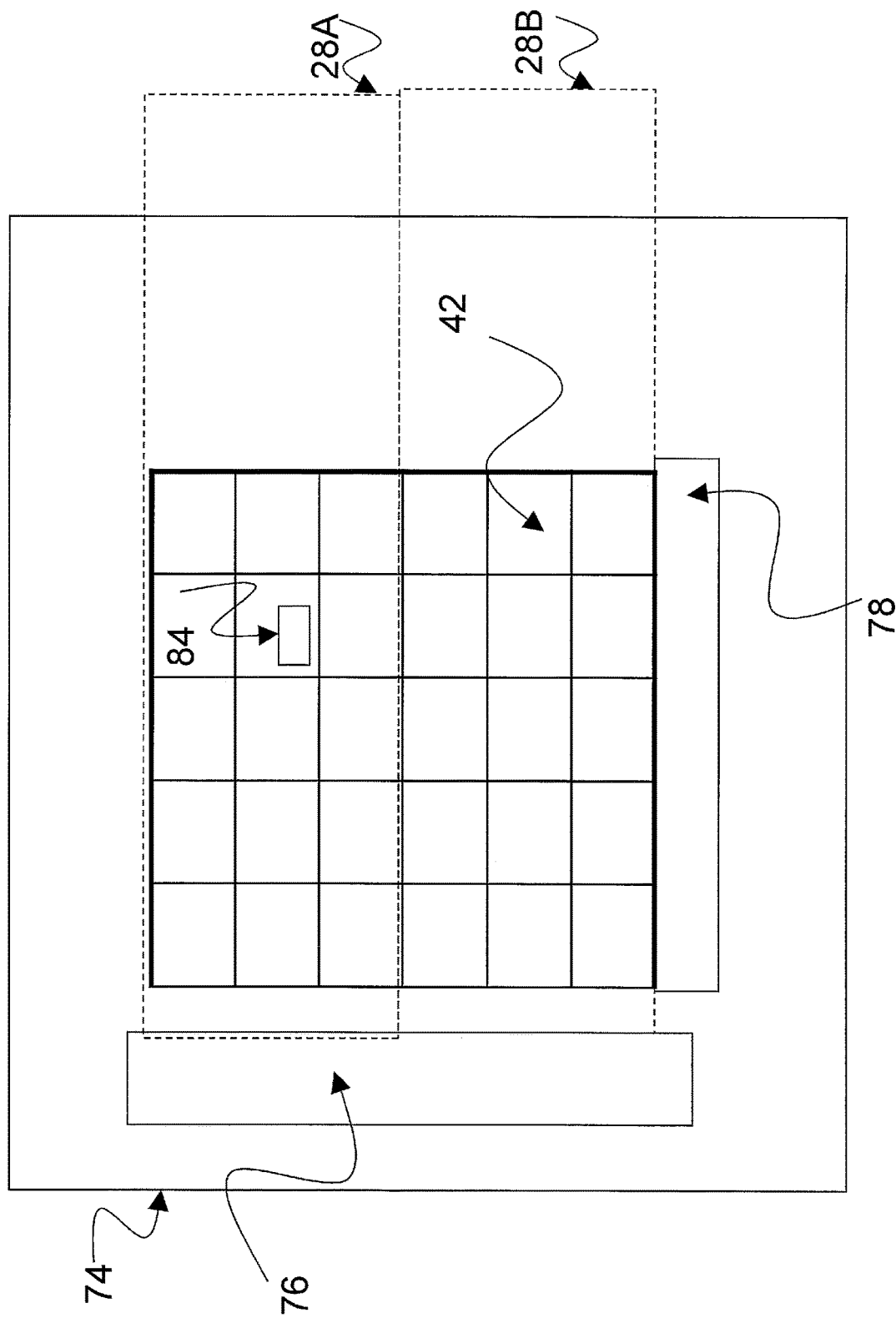
Figure 19: Ninth embodiment

Ninth embodiment

Figure 20A
Frame F1 (written N times)

| | | | | | |
|---|---|---|---|---|---|
| Row 1 | 0 | 1 | 0 | 0 | 1 |
| Row 2 | 0 | 1 | 0 | 0 | 1 |
| Row 3 | 1 | 1 | 1 | 1 | 1 |
| Row 4 | 0 | 0 | 1 | 0 | 0 |
| Row 5 | 0 | 0 | 0 | 0 | 0 |
| Row 6 | 0 | 0 | 0 | 0 | 0 |

Rows 1-3 TOP = $+V_{EW}$
Rows 4-6 TOP = $-V_{EW}$

Figure 20B
Frame F1B (written N times)

| | | | | | |
|---|---|---|---|---|---|
| Row 1 | 1 | 1 | 0 | 1 | 0 |
| Row 2 | 1 | 1 | 0 | 1 | 0 |
| Row 3 | 0 | 0 | 0 | 0 | 0 |
| Row 4 | 1 | 1 | 1 | 0 | 1 |
| Row 5 | 1 | 1 | 1 | 1 | 1 |
| Row 6 | 1 | 1 | 1 | 1 | 1 |

Rows 1-3 TOP = $-V_{EW}$
Rows 4-6 TOP = $+V_{EW}$

Figure 20C
Frame F2 (written N times)

| | | | | | |
|---|---|---|---|---|---|
| Row 1 | 0 | 1 | 0 | 0 | 1 |
| Row 2 | 0 | 1 | 0 | 0 | 1 |
| Row 3 | 1 | 1 | 1 | 1 | 1 |
| Row 4 | 0 | 0 | 1 | 0 | 0 |
| Row 5 | 0 | 0 | 0 | 0 | 0 |
| Row 6 | 0 | 0 | 0 | 0 | 0 |

Rows 1-3 TOP = $+V_{EW}$
Rows 4-6 TOP = $-V_{EW}$

Figure 20D
Frame F2B (written N times)

| | | | | | |
|---|---|---|---|---|---|
| Row 1 | 1 | 1 | 0 | 1 | 0 |
| Row 2 | 1 | 1 | 0 | 1 | 0 |
| Row 3 | 0 | 0 | 0 | 0 | 0 |
| Row 4 | 1 | 1 | 1 | 0 | 1 |
| Row 5 | 1 | 1 | 1 | 1 | 1 |
| Row 6 | 1 | 1 | 1 | 1 | 1 |

Rows 1-3 TOP = $-V_{EW}$
Rows 4-6 TOP = $+V_{EW}$

METHOD OF DRIVING AN ACTIVE MATRIX ELECTRO-WETTING ON DIELECTRIC DEVICE AND AN ACTIVE MATRIX ELECTRO-WETTING ON DIELECTRIC DEVICE

RELATED APPLICATIONS

This application is a national phase of International Patent Application Ser. No. PCT/JP2015/006176, filed on Dec. 10, 2015 which claims priority to GB Application No. 1500260.3 filed on Jan. 8, 2015, the entire disclosures of which are hereby incorporated by reference.

TECHNICAL FIELD

The present invention relates to active matrix arrays and elements thereof. In a particular aspect, the present invention relates to digital microfluidics, and more specifically to Active Matrix Electro-wetting-On-Dielectric (AM-EWOD). Electro-wetting-On-Dielectric (EWOD) is a known technique for manipulating droplets of fluid on an array. Active Matrix EWOD (AM-EWOD) refers to implementation of EWOD in an active matrix array incorporating transistors, for example by using thin film transistors (TFTs). The invention further relates to methods of driving such a device.

BACKGROUND ART

Electro-wetting on dielectric (EWOD) is a well-known technique for manipulating droplets of fluid by application of an electric field. It is thus a candidate technology for digital microfluidics for lab-on-a-chip technology. An introduction to the basic principles of the technology can be found in "Digital microfluidics: is a true lab-on-a-chip possible?", R. B. Fair, Microfluid Nanofluid (2007) 3:245-281).

FIG. 1 shows a part of a conventional EWOD device in cross section. The device includes a lower substrate 72, the uppermost layer of which is formed from a conductive material which is patterned so that a plurality of electrodes 38 (e.g., 38A and 38B in FIG. 1) are realized. The electrode of a given array element may be termed the element electrode 38. The liquid droplet 4, may consist of any polar (or partially polar) material (which is commonly also aqueous and/or ionic), and is constrained in a plane between the lower substrate 72 and a top substrate 36. A suitable gap between the two substrates may be realized by means of a spacer 32, and a non-polar fluid 34 (for example an oil, for example dodecane or silicone oil or any other alkane or mineral oil) may be used to occupy the volume not occupied by the liquid droplet 4. Alternatively, and optionally, the volume not occupied by the liquid droplet could be filled with air. An insulator layer 20 disposed upon the lower substrate 72 separates the conductive electrodes 38A, 38B from a first hydrophobic surface 16 upon which the liquid droplet 4 sits with a contact angle 6 represented by θ. On the top substrate 36 is a second hydrophobic layer 26 with which the liquid droplet 4 may come into contact. Interposed between the top substrate 36 and the second hydrophobic layer 26 is a top substrate electrode 28.

The contact angle θ 6 is defined as shown in FIG. 1, and is determined by the balancing of the surface tension components between the solid-liquid ($\gamma_{SL}$), liquid-gas ($\gamma_{LG}$) and non-polar fluid ($\gamma_{SG}$) interfaces, and in the case where no voltages are applied satisfies Young's law, the equation being given by:

$$\cos\theta = \frac{\gamma_{SG} - \gamma_{SL}}{\gamma_{LG}} \qquad \text{(equation 1)}$$

In certain cases, the relative surface tensions of the materials involved (i.e the values of $\gamma_{SL}$, $\gamma_{LG}$ and $\gamma_{SG}$) may be such that the right hand side of equation (1) is less than −1. This may commonly occur in the case in which the non-polar fluid 34 is oil. Under these conditions, the liquid droplet 4 may lose contact with the hydrophobic surfaces 16 and 26, and a thin layer of the non-polar fluid 34 (oil) may be formed between the liquid droplet 4 and the hydrophobic surfaces 16 and 26.

In operation, voltages termed the EW drive voltages, (e.g. $V_T$, $V_0$ and $V_{00}$ in FIG. 1) may be externally applied to different electrodes (e.g. element electrodes 38, 38A and 38B, respectively). The resulting electrical forces that are set up effectively control the hydrophobicity of the hydrophobic surface 16. By arranging for different EW drive voltages (e.g. $V_0$ and $V_{00}$) to be applied to different element electrodes (e.g. 38A and 38B), the liquid droplet 4 may be moved in the lateral plane between the two substrates 72 and 36.

In the following description, it will be assumed that an element of an EWOD device, such as the device of FIG. 1, may receive "digital" data so that the element is required to be put in either an "actuated" state (in which the voltage applied across the element is sufficient for a liquid droplet in the element (if one is present in the element) to experience a significant electro-wetting force) or a "non-actuated" state (in which the voltage applied across the element is not sufficient for a liquid droplet in the element (if one is present in the element) to experience a significant electro-wetting force). An element of an EWOD device may be put into the actuated state by applying a voltage difference across the EWOD element having a magnitude that is equal to, or greater than, a threshold voltage $V_{EW}$, whereas if the voltage difference across the EWOD element has a magnitude that is less, or much less than the threshold voltage $V_{EW}$ the element is in its non-actuated state. The threshold voltage $V_{EW}$ is often referred to as an "actuation voltage", and this term is used below. In practice the threshold voltage may typically be determined as the minimum voltage required to effect droplet operations, for example the moving or splitting of droplets. In many cases there is one threshold voltage for droplets to move and a second (higher) threshold voltage for droplets to split, and in such cases the "actuation voltage" is preferably set above the threshold required for droplets to split. In practice the non-actuated state may typically be zero volts.

Typically EWOD systems may be considered to be digital, in that the EWOD elements are programmed either to an actuated state or a non-actuated state. However, the actuation due to electro-wetting is essentially analogue in nature, so the actuation force can be tuned by varying the voltage (up to a certain maximum voltage at which the actuation force saturates). Some performance parameters also depend in an analogue manner on voltage—for example the maximum speed of movement of a droplet is approximately proportional to the applied voltage. It should therefore be understood that an EWOD device may alternatively be operated by supplying analogue input data rather than digital data.

FIG. 2 shows a circuit representation of the electrical load presented between the element electrode 38 and the top substrate electrode 28. The liquid droplet 4 can be modelled as resistor and capacitor in parallel, the hydrophobic surfaces 16 and 26 as capacitors and the insulator 16 as a capacitor.

U.S. Pat. No. 6,565,727 (Shenderov, issued May 20, 2003) discloses a passive matrix EWOD device for moving droplets through an array.

U.S. Pat. No. 6,911,132 (Pamula et al., issued Jun. 28, 2005) discloses a two dimensional EWOD array to control the position and movement of droplets in two dimensions.

U.S. Pat. No. 6,565,727 further discloses methods for other droplet operations including the splitting and merging of droplets, and the mixing together of droplets of different materials.

U.S. Pat. No. 7,163,612 (Sterling et al., issued Jan. 16, 2007) describes how TFT based electronics may be used to control the addressing of voltage pulses to an EWOD array by using circuit arrangements very similar to those employed in AM display technologies.

The approach of U.S. Pat. No. 7,163,612 may be termed "Active Matrix Electro-wetting on Dielectric" (AM-EWOD). There are several advantages in using TFT based electronics to control an EWOD array, namely:

The approach of U.S. Pat. No. 7,163,612 may be termed "Active Matrix Electro-wetting on Dielectric" (AM-EWOD). There are several advantages in using TFT based electronics to control an EWOD array, namely:

Driver circuits can be integrated onto the AM-EWOD array substrate.

TFT-based electronics are well suited to the AM-EWOD application. They are cheap to produce so that relatively large substrate areas can be produced at relatively low cost.

TFTs fabricated in standard processes can be designed to operate at much higher voltages than transistors fabricated in standard CMOS processes. This is significant since many EWOD technologies require EWOD actuation voltages in excess of 20V to be applied.

U.S. Pat. No. 7,163,612 does not however disclose any circuit embodiments for realizing the TFT backplane of the AM-EWOD.

EP2404675 (Hadwen et al., published Jan. 11, 2012) describes array element circuits for an AM-EWOD device. Various methods are known for programming the array and applying an EWOD actuation voltage to the EWOD element electrode. The voltage write function described includes a memory element of standard means, for example, based on Dynamic RAM (DRAM) or Static RAM (SRAM) and input lines for programming the array element.

Whilst EWOD (and AM-EWOD) devices can be operated with either DC or AC actuation voltages, in practice there are many reasons for preferring an AC method of driving, as reviewed in the previously cited reference R. B. Fair, Microfluid Nanofluid (2007) 3:245-281). It may be noted that droplets can be actuated and manipulated for a wide range of AC driving frequencies ranging typically from a few hertz to several kHz.

One possible method for implementing an AC driving method in an AM-EWOD device is to apply a ground potential to the top substrate electrode 28. To program a given element electrode in the array to a non-actuated state, the element electrode is written to a ground potential. To program a given array element electrode 38 to an actuated state, the element electrode potential 38 is written to have a potential that alternates between $V_{EW}$ and $=-V_{EW}$. This method of driving requires that the maximum voltage that must be switched by the transistors in the circuit in order to drive the element electrode 38 is required to be $2V_{EW}$.

U.S. Pat. No. 8,173,000 (Hadwen et al., issued May 8, 2012) describes an AM-EWOD device with array element circuit and method for writing an AC actuation voltage to the electrode. The AC drive scheme described by this patent utilizes the application of AC signals to both the element electrode 38 and to the top substrate electrode 28 of the device. Therefore, the device is capable of generating an electro-wetting voltage (voltage between the element electrode and the top substrate electrode 28) that varies between $+V_{EW}$ and $-V_{EW}$, whilst the transistors in the array element circuit are only ever required to operate with a rail-to-rail voltage of $V_{EW}$. The array element circuit disclosed by U.S. Pat. No. 8,173,000 contains a relatively large number of transistors.

US application 2012/0007608 (Hadwen et al., published Jan. 12, 2012) describes how an impedance (capacitance) sensing function can be incorporated into the array element. The impedance sensor may be used for determining the presence and size of liquid droplets present at each electrode in the array.

U.S. Pat. No. 8,221,605 describes a coplanar electrode arrangement wherein the top substrate electrode is omitted and is replaced by an in-plane counter electrode which is disposed upon the lower substrate along with the drive electrodes. U.S. Pat. No. 8,221,605 discloses how the reference electrode may be comprise a two dimensional grid of conducting lines electrically and physically distinct from the drive electrodes.

SUMMARY OF INVENTION

A first aspect of the present invention provides a method of driving an active matrix electro-wetting on dielectric (AM-EWOD) device with an alternating sign of actuation voltage, the AM-EWOD device comprising a plurality of array element electrodes defining respective array elements and a reference electrode. The method comprises (i) setting the reference electrode to a first reference voltage and (ii) writing a set of data to array element electrodes of array elements of the device, whereby an array element is actuated if a first data voltage is written to the corresponding array element electrode to define a voltage difference of magnitude equal to or greater than an actuation voltage and having a first sign across the array element and is non-actuated if a second, different data voltage is written to the corresponding array element electrode. That is, the voltage difference across an array element obtained by applying the first reference voltage to the reference electrode and applying the first data voltage to the array element electrode of the array element is of sufficient magnitude to actuate the array element, whereas the voltage difference across an array element obtained by applying the first reference voltage to the reference electrode and applying the second data voltage to the array element electrode of the array element is not of sufficient magnitude to actuate the array element. The method then comprises (iii) either: (a) maintaining the voltages written to the array element electrodes until a time $t_0$ or (b) re-writing N−1 times (where N≥2) the set of data to the array element electrodes of the array elements.

The method then comprises (iv) setting the reference electrode to a second reference voltage different from the first reference voltage; (v) writing another set of data to array element electrodes of at least some array elements of the device whereby an array element is actuated if a third data voltage is written to the corresponding array element electrode to define a voltage difference of magnitude equal to or greater than the actuation voltage and having a second sign opposite to the first sign across the array element and is non-actuated if a fourth, different data voltage is written to the corresponding array element electrode (that is, the voltage difference across an array element obtained by applying the second reference voltage to the reference electrode and applying the third data voltage to the array element electrode of the array element is of sufficient magnitude to actuate the array element, whereas the voltage difference across an array element obtained by applying the second reference voltage to the reference electrode and applying the fourth data voltage to the array element electrode of the array element is not of sufficient magnitude to actuate the array element); and (vi) either: (a) maintaining the voltages written to the array element electrodes until a time $t_1$ or (b) re-writing M−1 times (where M≥2) the another set of data to the array element electrodes of the at least some array elements.

BRIEF DESCRIPTION OF DRAWINGS

In the annexed drawings, like references indicate like parts or features:

FIG. 3 is a schematic diagram depicting a an AM-EWOD device in schematic perspective in accordance with a first and exemplary embodiment of the invention;

FIG. 4 shows a cross section through some of the array elements of the exemplary AM-EWOD device of FIG. 3;

FIG. 5 is a schematic diagram depicting the arrangement of thin film electronics in the exemplary AM-EWOD device of FIG. 3 according to a first embodiment of the invention;

FIG. 6 is a schematic diagram depicting the array element circuit for use in the array elements of the exemplary AM-EWOD device of FIG. 3 according to a first embodiment of the invention;

FIG. 7 is a graphical representation of the timings and voltage levels of the driving signals utilized in the exemplary AM-EWOD device of FIG. 3 according to a first embodiment of the invention;

FIG. 8 is a graphical representation of exemplary frames of data written to a part of the array of the exemplary AM-EWOD device of FIG. 3 according to a first embodiment of the invention;

FIG. 9 is a graphical representation of exemplary frames of data written to a part of the array of the exemplary AM-EWOD device of FIG. 3 according to a second embodiment of the invention;

FIG. 10 is a graphical representation of the timings and voltage levels of the driving signals utilized in the exemplary AM-EWOD device of FIG. 3 according to a third embodiment of the invention;

FIG. 11 is a graphical representation of exemplary frames of data written to a part of the array of the exemplary AM-EWOD device of FIG. 3 according to a fourth embodiment of the invention;

FIG. 12 is a schematic diagram depicting the array element circuit for use in the array elements of the exemplary AM-EWOD device of FIG. 3 according to a fifth embodiment of the invention;

FIG. 13 is a graphical representation of exemplary frames of data written to a part of the array of the exemplary AM-EWOD device of FIG. 3 according to a sixth embodiment of the invention;

FIG. 14 is a schematic diagram depicting an example arrangement of thin film electronics in the exemplary AM-EWOD device of FIG. 3 according to a seventh embodiment of the invention;

FIG. 15 shows a cross section through some of the array elements of the exemplary AM-EWOD device of FIG. 3, according to a seventh embodiment of the invention;

FIG. 16 is a schematic diagram depicting the array element circuit for use in the array elements of the exemplary AM-EWOD device of FIG. 3 according to an eighth embodiment of the invention;

FIG. 17 is a schematic diagram depicting the arrangement of thin film electronics in the exemplary AM-EWOD device of FIG. 3, according to a eighth embodiment of the invention;

FIG. 18 shows a cross section through some of the array elements of the exemplary AM-EWOD device of FIG. 3, according to a ninth embodiment of the invention;

FIG. 19 is a schematic diagram depicting the arrangement of thin film electronics in the exemplary AM-EWOD device of FIG. 3 according to a ninth embodiment of the invention;

FIG. 20 is a graphical representation of exemplary frames of data written to a part of the array of the exemplary AM-EWOD device of FIG. 3 according to a ninth embodiment of the invention;

DESCRIPTION OF EMBODIMENTS

Figure 1:
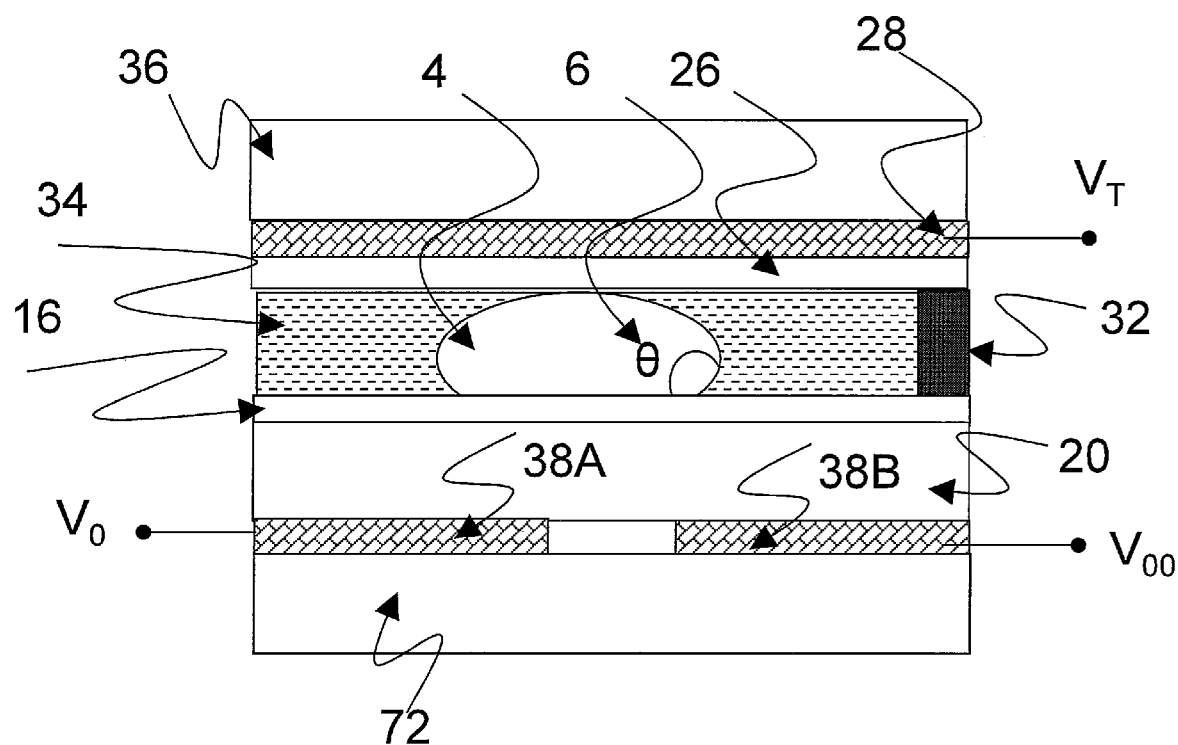
FIG. 1 is a schematic diagram depicting a conventional EWOD device in cross-section.

FIG. 3 is a schematic diagram depicting an AM-EWOD device in accordance with an exemplary embodiment of the present invention. The AM-EWOD device has a lower substrate 72 with thin film electronics 74 disposed upon the substrate 72. The thin film electronics 74 are arranged to drive the array element electrodes 38. A plurality of array element electrodes 38 are arranged in an electrode array 42, having X×Y elements where X and Y may be any integer. A liquid droplet 4 of a polar liquid is enclosed between the substrate 72 and a top substrate 36, although it will be appreciated that multiple liquid droplets 4 can be present.

FIG. 4 is a schematic diagram depicting a pair of the array elements 38A and 38B in cross section that may be utilized in the AM-EWOD device of FIG. 3. The device configurations of FIGS. 3 and 4 bear similarities to the conventional configuration shown in FIG. 1, with the AM-EWOD device of FIGS. 3 and 4 further incorporating the thin-film electronics 74 disposed on the lower substrate 72. The uppermost layer of the lower substrate 72 (which may be considered a part of the thin film electronics layer 74) is patterned so that a plurality of the array element electrodes 38 (e.g., 38A and 38B in FIG. 4) are realized. These may be termed the array element electrodes. The term array element electrode may be taken in what follows to refer both to the electrode 38 associated with a particular array element, and also to the node of an electrical circuit directly connected to this electrode 38.

The term reference electrode 28 may be understood in all that follows to mean the most general structure for providing a reference potential to liquid droplet 4. The term reference electrode 28 may thus be considered to describe a structure consisting of any one of, or any combination of, top substrate electrode(s) 28, 28A, 28B (see for example FIG. 18) and in-plane counter electrode(s) 31 (see, for example FIG. 15) or some other means of connecting an electrically conductive structure to the droplet, e.g. a catena. The reference electrode 28 may also be directly in contact with the liquid droplet 4, or may contact the liquid droplet 4 via an insulator layer and/or hydrophobic coating layer. Equivalently the term reference electrode 28 is used to describe the electrical circuit node corresponding to the physical reference electrode structure.

FIG. 5 is a schematic diagram depicting an exemplary arrangement of thin film electronics 74 upon the substrate 72. Each element of the electrode array 42 contains an array element circuit 84 for controlling the electrode potential of a corresponding electrode 38. Integrated row driver 76 and column driver 78 circuits are also implemented in thin film electronics to supply control signals to the array element circuits 84.

A serial interface 80 may also be provided to process a serial input data stream and write the required voltages to the electrode array 42. A voltage supply interface 83 provides the corresponding supply voltages, top substrate drive voltages, and other requisite voltage inputs as further described herein. The number of connecting wires 82 between the array substrate 72 and external drive electronics, power supplies etc. can be made relatively few, even for large array sizes. Optionally the serial data input may be partially parallelized, for example if 2 data input lines are used the first may supply data for columns 1 to X/2 and the second for columns (1+X/2) to M with minor modifications to the column driver 78 circuits. In this way the rate at which data can be written to the array is increased, a standard technique used in Liquid Crystal Display driving circuitry.

Generally, an exemplary AM-EWOD device that includes thin film electronics 74 is configured as follows. The AM-EWOD device includes a substrate electrode (e.g., top substrate electrode 28) and a plurality of array elements, each array element including an array element electrode (e.g., array element electrodes 38).

Relatedly, the AM-EWOD device is configured to perform a method of controlling an actuation voltage to be applied to a plurality of array elements. The AM-EWOD includes a top substrate electrode 28 and a plurality of array elements, each array element including an array element electrode 38. The actuation voltage at each array element is herein referred to as the electro-wetting voltage and may be defined as the potential difference between the element electrode 38 and the top substrate electrode 28. The method of controlling the actuation voltage includes the steps of applying a voltage to at least a portion of the array element electrodes, and supplying voltage signal V2 to the top substrate electrode 28.

FIG. 6 is a schematic diagram showing an example arrangement of thin film electronics in the array element circuit 84. The array element circuit 84 consists of a standard Dynamic RAM (DRAM) memory circuit having 1 transistor and 1 capacitor (1T1C). The column line DATA is used to write the electro-wetting voltage to the array element and is common to each array element within the same column of the array. The transistor 110 (a TFT) is connected between the column line DATA and the array element electrode 38. The gate line ENABLE is used to address the row and is common to each array element within the same row of the array. ENABLE is connected to the gate of transistor 110. A capacitor 44 is used to store the written electro-wetting voltage and is connected between the array element electrode 38 and a ground line. In FIG. 6, the transistor 110 is shown as an n-type device and row addressing will be enabled by taking the ENABLE signal to a high voltage level. It will be appreciated that in this and all other embodiments the array element circuit 84 could equally be realized with a p-type transistor 110 with in this case the row addressing being implemented by taking the ENABLE signal to a low voltage level.

Figure 2:
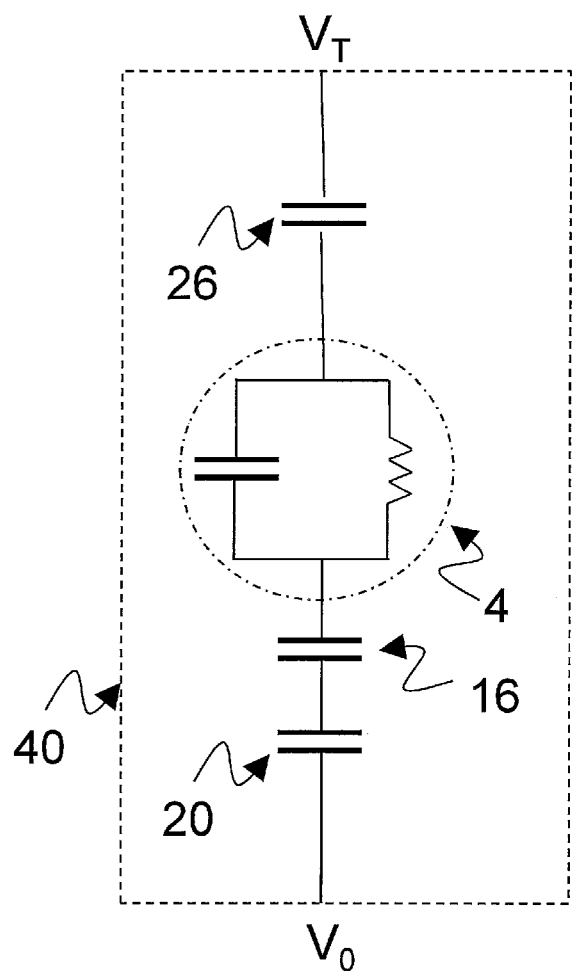
FIG. 2 shows a circuit representation of the load presented at the array element when a droplet is present.

The remainder of the AM-EWOD device is of the standard construction previously described with respect to FIGS. 2-4 and includes a top substrate 36 having a top substrate electrode 28.

The electrical load presented between the array element electrode 38 and top substrate electrode 28 is a function of whether or not a liquid droplet 4 is present at the location of the array element, and is shown represented by the load circuit 40 in FIG. 6. Typically the liquid droplet 4 is relatively conductive and electrically the load circuit 40 approximates closely to a capacitor whose value comprises the series contributions of the capacitances of the insulator 20 and first and second hydrophobic (16 and 26) surfaces.

The driving signal TOP is connected to the top substrate electrode 28 which may be common to all elements within the array. The actuation voltage at a given array element may be defined as the potential difference between the array element electrode 38 and the top substrate electrode 28.

According to a first embodiment of the invention, the actuation voltages at each array element of the AM-EWOD device are controlled by means of a "multi-frame-AC" method of driving. In summary each unique frame of data (F1) is written and re-written N times. The voltage signal on VTOP is then inverted and the inverse data frame (F1B) is then written and re-written N times. The process is then repeated for the next frame of data (F2 and then F2B).

In detail this method of driving is described as follows, with reference to FIG. 7 which shows a graphical representation of the timing signals supplied to the input data line DATA and to the top substrate electrode 28, and with reference to FIG. 8 whereby a graphical representation of exemplary data written to a whole or a part of the array is shown. In FIG. 8, a frame of data is denoted as a 2-dimensional array of squares, and a "1" or a "0" is shown in each array element to denote array elements written to either $+0.5 \times V_{EW}$ (programmed to "1") or $-0.5 \times V_{EW}$ (programmed to "0"). The voltage signal applied to the reference electrode (in this example the top substrate electrode 28) is also shown in FIG. 7 and indicated in FIGS. 8A-8D for each frame of data Digitized data is written to the array element electrodes by the row driver circuit 76 and column driver circuit 78. Each array element electrode 38 in the array can be written to the high voltage $0.5 \times V_{EW}$ or the low voltage $-0.5 \times V_{EW}$ The procedure for writing data to the array is as follows:

The top substrate electrode 28 (or reference electrode) is set to a first reference voltage, in this example to $-0.5 \times V_{EW}$ In period 1, a frame F1 of EWOD data is written to the array element electrodes of array elements in order to manipulate the droplets in the desired manner. In order to actuate a droplet at a given array element the voltage of the array element electrode at that array element is written to a first data voltage having a value such that the magnitude of overall voltage across the array element is equal to, or exceeds, the voltage magnitude (the "threshold voltage") required to put the array element into the actuated state. In this example the first data voltage is $+0.5 \times V_{EW}$, giving an overall voltage across the array element of $0.5 \times V_{EW} - (-0.5 \times V_{EW}) = V_{EW}$—that is, the overall voltage magnitude across the array element is equal to the magnitude of the threshold voltage $V_{EW}$ and the array element is therefore put in the actuated state. To not actuate a droplet at a given array element the voltage of the array element electrode at that array element is written to a second data voltage having a value such that the overall voltage across the array element has a lower magnitude than the voltage (the "threshold voltage") required to put the array element into the actuated state. In this example the second data voltage is $-0.5 \times V_{EW}$, giving an overall voltage across the array element of $-0.5 \times V_{EW} - (-0.5 \times V_{EW}) = 0$— that is, the overall voltage across the array element is zero, and so is less than the magnitude of the threshold voltage $V_{EW}$ and the array element is therefore not put in the actuated state. FIG. 8A shows a graphical representation of exemplary data written to the array for Frame F1 Following the completion of the operation of writing data to the array, the write operation is repeated multiple times. In the example of FIG. 7 the write operation is repeated a further N−1 times in periods 2 to N, so that the write operation is carried out a total of N times, with the same data written and re-written to the array with the top substrate electrode 28 maintained at the low voltage $-0.5V_{EW}$.

The potential of the top substrate electrode 28 (reference electrode) is then switched to a second reference value, in this example to the voltage $+0.5 \times V_{EW}$.

The inverse of the data of frame F1, frame F1B, is then written and re-written N times to the array in periods N+1 to 2N with the potential of the top substrate electrode 28 at $+0.5 \times V_{EW}$. In order to put a droplet at a given array element into the actuated state, the voltage of the array element electrode at that array element is written to a third data voltage having a value such that the magnitude of overall voltage across the array element is equal to, or exceeds, the voltage magnitude (the "threshold voltage") required to put the array element into the actuated state. In this example the first data voltage is $-0.5 \times V_{EW}$, giving an overall voltage across the array element of $-0.5 \times V_{EW} - (+0.5 \times V_{EW}) = -V_{EW}$—that is, the magnitude of the overall voltage across the array element is equal to the magnitude of the threshold voltage $V_{EW}$ and the array element is therefore put in the actuated state. To not actuate a droplet at a given array element the voltage of the array element electrode at that array element is written to a fourth data voltage having a value such that the overall voltage across the array element has a lower magnitude than the voltage (the "threshold voltage") required to put the array element into the actuated state. In this example the fourth data voltage is $0.5 \times V_{EW}$, giving an overall voltage across the array element of $0.5 \times V_{EW} - (+0.5 \times V_{EW}) = 0$—that is, the overall voltage across the array element is zero, and so is less than the magnitude of the threshold voltage $V_{EW}$ and the array element is therefore not put in the actuated state. FIG. 8B shows a graphical representation of exemplary data written to the array for frame F1B.

The potential of the top substrate electrode 28 is then taken to the first reference voltage, in this example to $-0.5 \times V_{EW}$.

The process is then repeated for the next frame of data F2 where the pattern of data written in frame F2 may be different to frame F1 as is desirable to conduct droplet operations. FIGS. 8C and 8D shows a graphical representation of exemplary data written to the array for frames F2 and F2B

According to this method of driving, an electro-wetting voltage of either $+V_{EW}$ or $-V_{EW}$ is maintained across the droplet load circuit when the droplet load circuit is actuated and 0V is maintained when the droplet load circuit is not actuated. Thus the electro-wetting voltage is alternated between $+V_{EW}$ and $-V_{EW}$ and this is achieved whilst only requiring a voltage that ranges between $-0.5 \times V_{EW}$ and $+0.5 \times V_{EW}$ to be switched by the TFT circuit elements.

As noted the described method of driving may be non-ideal because of the finite time required to write each frame of data to the array. Consequently, for the first of the N times frame 1 is written, there is a delay between when the voltage on the top substrate is transitioned to when the array element is written with data. For the first row of the array to be written this delay is very small, for the last row of the array to be written the delay is only a small amount less than the time required to write the frame of data. For this reason the data is written as rapidly as possible and each frame of data is written N times. The maximum time fraction for which an array element is written to the 'wrong' state is thus approximately 1/N. If N is large enough, this time fraction becomes insignificant, in the sense that it is sufficiently small such that the control of liquid droplets 4 is unaffected by the non-ideal driving signals. Typically in operation N may be ~8 or more and it is found that under these conditions the array is able to actuate droplets and perform droplet operations (moving, merging, splitting, mixing) in an acceptable manner. The implementation of the invention also utilizes the fact that the frame rate which can be supported by the electronics is typically much higher than the data rate written to the array. For example electrical writing of data can typically be at hundreds of frames per second or more, whereas the typical frame rates of data for manipulating fluids are hertz or tens of hertz.

It will be apparent to one skilled in the art that a number of variants of the array element circuit 84 of FIG. 6 may also be realized, without substantially changing the functionality or principles of operation of the array element circuit. For example n-type switch transistor 110 may be replaced by a p-type transistor and the ENABLE driving signal inverted. A further example is that switch transistor 110 may be comprised of two or more devices in series, as is well known in liquid crystal display pixel circuits as a method of minimizing leakage current through the switch transistor.

A key advantage of the invention is that an AC method of driving can be implemented in which the electro-wetting voltage alternates between $+V_{EW}$ and $-V_{EW}$ whilst only requiring a voltage that ranges between $-0.5 \times V_{EW}$ and $+0.5 \times V_{EW}$ to be switched by the TFT circuit elements. This is achieved by means of a simple 1 transistor 1 capacitor (1T1C) array element circuit.

The 1T1C array element circuit is much smaller than the array element circuit described in U.S. Pat. No. 8,173,000. This minimizes the physical size of the array element circuitry that can be realized in a typical TFT process. Since the minimum size of the array element electrode is typically constrained by the physical area occupied by the underlying control electronics, the minimum achievable size of the array element electrode 38 is also minimized. Consequently the 1T1C array element circuit enables smaller droplets to be created and manipulated. The manipulation of small droplets has many small applications, for example in the use of single cell or single molecule assays or in digital PCR applications.

A further advantage is that the smaller and simpler array element circuits that are possible according to the invention result in an improved manufacturing yield.

A further advantage is that in the case where the thin film electronics are disposed on a partially transparent substrate, e.g. a glass substrate as is commonly used in standard display manufacturing TFT processes, reducing the number of circuit components in the array element may increase the optical transparency of the array element. This may have application, for example, when the device is used to perform chemical or biochemical assays having an optical means of readout, for example a change in ab-sorption, fluorescence or chemi-luminescence of the liquid droplet. Increasing the transparency of the array element has the effect of increasing the optical signal that can be transmitted through the device.

A further advantage is that by addressing the array using the multi-frame writing method of this embodiment, the voltage written to each of the array element electrodes in the array is continuously refreshed at a relatively high frame rate. This is advantageous for the following two reasons.

1. The operation of the circuit is able to tolerate a relatively high leakage of the charge through the transistor 110 when this transistor is turned off. In general terms, leakage of charge from the array element electrode 38 through transistor 110 is deleterious to performance because it results in a drop in the written voltage at the array element electrode 38. The rapid write and re-write associated with this method of driving reduces the time for which leakage can occur before the voltage at the array element electrode 38 is refreshed. One benefit of this is that the invention can be realized using thin film transistor manufacturing processes that have relatively high transistor leakage (off) currents, for example low temperature polysilicon (LTPS). A second benefit is that it may become possible to decrease the size of capacitor 44. Reducing also reduces the physical layout area that the capacitor occupies in the array element circuit. Since typically the physical size of this capacitor may determine the limitation in the physical size of the electronic design of the array element, minimizing the value of the capacitor may enable smaller array elements to be realized. This in turn further reduces the minimum size of liquid droplets 4 that can be manipulated on the array.

2. The operation of the circuit is better able to tolerate a charge sharing effect associated with the movement of liquid droplets 4 on the array. The charge sharing effect may be explained as followed. Consider the situation where an array element does not have a liquid droplet 4 present at its location. The array element electrode 38 of this array element is then actuated by writing a voltage $0.5 \times V_{EW}$ to the electrode. This voltage is stored on capacitor 44 and the transistor 110 is switched off. The voltage written to the element electrode 38 causes a liquid droplet 4 in the location of an adjacent array element to move to move to the location of the actuated electrode. As a result of this movement of the liquid droplet 4, the charge written to capacitor 44 is shared between capacitor 44 and the capacitance of the load circuit 40. The voltage written to the element electrode 38 then reduces by an amount that depends on the ratio of the capacitors 40 and 44 as a result of this charge sharing. The result of the reduction in voltage is that the force acting upon the droplet is also reduced and the speed of movement of the droplet is decreased. By implementing the multi-frame AC method of driving, the voltage at the array element electrode 38 is constantly being refreshed, typically at a much faster rate than that associated with the movement of droplets. By implementing the multi-frame AC method of driving the charge sharing effect can thus be largely eliminated and higher droplet translation speeds can be achieved than otherwise would be the case.

The method of driving the device has been described for what is in effect "digital" data-the voltage between the array element electrode 38 and the top substrate electrode 28 is either written to an actuated state (the electro-wetting voltage alternates between $+V_{EW}$ and $-V_{EW}$) or a non-actuated state (the electro-wetting voltage is zero potential). It will be clear to one skilled in the art how the described method of driving could easily be adapted so that analogue data is written to the array, and a different voltage may be written to different array elements. For example, to write an actuation voltage of $V_A$ to a given array element, a voltage $(V_A-0.5 \times V_{EW})$ is written in frame F1 and a voltage of $0.5 \times V_{EW} - V_A$ in frame F1B, and that $V_A$ may have a different value for different elements within the array.

The above method of driving the device has described the case where total number of frames written in F1 is equal to the total number of frames written in F1B, which is equal to N. Optionally this may not be the case and a different number of frames=M (where M#N) may be written for frame F1B, which will have substantially the same effect in terms of the fluid handling performance of the device. Similarly a different number of frames may be written in F2 to F1 etc.

The above method of driving the device has also described the case where the voltage amplitude of the actuated state written in frames F1 and F1B is equal in magnitude and opposite in sign. The invention is not however limited to this and optionally, the magnitude of the voltage signals may be unequal for the positive and negative frames. For example, the actuation potential could be made to equal $+0.5 \times V_{EW1}$ in frame F1 and $-0.5 \times V_{EW2}$ in frame F2, where $V_{EW1} \neq V_{EW2}$, for example $V_{EW1}=0.9 \times V_{EW}$ and $V_{EW2}=1.1 \times V_{EW}$ The overall effect in terms of the fluid handling performance of the device would be substantially unchanged.

A further possible variant of the first embodiment is that the inversion operation (i.e. the inversion of reference electrode potential and the inversion of the data) does not necessarily need to occur at the start of the frame, optionally it could occur instead part way through a frame.

A second embodiment of the invention is as the first embodiment, with the exception that the organization of the data write operation is different.

The arrangement of data frames according to the operation of the device according to a second embodiment of the invention is shown in FIG. 9. The first frame of data F1 is written N times with the top substrate electrode 28 at a first reference potential, for example $-0.5 \times V_{EW}$. (FIG. 9A). The potential of the top substrate electrode 28 is then set to a second reference potential, for example $+0.5 \times V_{EW}$ and the inverse data of data frame 2, F2B is written to the array (FIG. 9B). The potential of the top substrate electrode 28 is then set to the first reference potential, in this example $-0.5 \times V_{EW}$ and the data of data frame 3, F3 is written to the array (FIG. 9C). The potential of the top substrate electrode 28 is then set to the second reference potential, in this example $+0.5 \times V_{EW}$ and the inverse data of data frame 4, F4B is written to the array (FIG. 9D), and so on. That is, rather than each frame of data being written multiple times normal and multiple times inverted as in the method of FIG. 1, each frame is written multiple times normal or is written multiple times inverted with the next frame written multiple times inverted or multiple times normal. By writing a frame normal and writing a next frame inverted, the time average of the voltage applied across the EWOD-element is expected to be zero.

An advantage of the second embodiment of the invention is that the rate at which unique frames of data can be written to the array is increased. This facilitates faster droplet operations, e.g. movement, splitting. This may be important in high throughput operations such as sample preparation, where there may be a desire to manipulate liquid droplets 4 as rapidly as possible.

Variants of the second embodiment are also possible. For example the data could be organized to write data frames in the sequence F1, F2, F3B, F4B, F5, F6, F7B, F8B, . . . etc, with the inversion operations occurring after the $2^{nd}$, $4^{th}$, $6^{th}$ and $8^{th}$ frames of data.

A third embodiment of the invention is disclosed whereby the AM-EWOD device construction is identical to the first embodiment, but an alternative method of driving is employed to operate the device. A graphical representation of the driving method employed in the operation of the device according to this embodiment is shown in FIG. 10. The principle of operation is similar to the first embodiment, except that instead of writing and re-writing each unique frame of data, the data is instead written once and held static for a hold time equivalent to (N−1) times the time required to perform the write operation for 1 frame. After this time, the voltage signal on the top substrate electrode 28 is changed from the first reference voltage to the second reference voltage, for example is inverted from −0.5×$V_{EW}$ to +0.5×$V_{EW}$, and data frame F1B is written followed by a hold time. The principles of operation of the device are essentially similar to as described for the first embodiment. The method of driving is non-ideal because of the finite time required to write the frame of data to the array. Consequently there is a delay between when the voltage on the top substrate is transitioned to when the array element is written with data, as previously described. For this reason it is advantageous for the data to be written as rapidly as possible, the length of the hold time should be sufficiently long such that the maximum time fraction for which an array element is written to the 'wrong' state (approximately 1/(1+ 0, where t is the hold time), is sufficiently small. If this is the case the control of liquid droplets 4 is unaffected by the non-ideal driving signals.

An advantage of the third embodiment of the invention is by only needing to write the frame of data once, the power consumption of the device is considerably reduced.

The third embodiment has been described for the case whereby the hold time t is identical for the operations immediately following frame F1 and frame F1B. Optionally, this need not be the case and where the hold time following frame F1 is t, then the hold time following frame F1B may be longer or may be shorter than t, without substantially affecting the performance of the device. Similarly the actuation potential of the positive and negative frames may be different.

It will be readily apparent that a combination of the second and third embodiments could also be realized by means of a small change to the timing schematics of FIG. 10, for example by making Frame 2 contain the DATA for F2B and frame 3 the data for F3, etc.

A fourth embodiment of the invention is as any of the previous embodiments with a modified row driver circuit 76 and column driver circuit 78. The modified row and column driver circuits may be configured to selectively address the array such that only a part of the array may be written. This may be utilized such that in the write/re-write operation only the rows of data in which some or all of the data written differs from the previous frame is written. An exemplary arrangement is shown in FIG. 11, which shows a graphical representation of the data written to the array. The position of the liquid droplet 4 on the array is also shown. A description of operation according to FIG. 11 is as follows:

In Frame F1, the array is written in its entirety.

In frame F1B the array is selectively addressed such that only rows 3-5 are written.

The reason for this is that there is no liquid droplet on or immediately adjacent to any of the array elements in row 1 or row 2. Therefore it is not necessary to re-write the data in rows 1 and rows 2 in its inverted state since the actuation of the droplet is not influenced by them.

In frame F2, only rows 3-5 are written. Even though the droplet is adjacent to row 2, row 2 does not need to be written because there is no change in the data between frame F1B and Frame F2. Row 1 does not need to be re-written for the same reason, and for the additional reason that there is no liquid droplet on the vicinity of row 1.

Frame F2B, row 1 is once again not re-written for the same reasons as above. In this case Row 2 is re-written since there is now a part of the liquid droplet adjacent to it.

An advantage of the fourth embodiment is that by selectively addressing the rows as described, the time required to write frames of data may be considerably reduced. Commonly in operation, liquid droplets 4 may only be present on a small proportion of the rows in the array. Therefore, in operation of the device according to this embodiment, the typical time required to write a frame of data may be considerably reduced. A shorter write time enables faster rates of data to be written to the array. Consequently the speed at which droplets can be moved through the array is increased. This is advantageous for applications requiring fast droplet movement, e.g. high throughput assays such as sample preparation.

Other arrangements of the data and the timing of the inversion operation that are variants of any of the first four embodiments are also possible.

A fifth embodiment of the invention, is as any of the previous embodiments, with a variant design of array element circuit as shown in FIG. 12. According to the fifth embodiment, transistor 110 is replaced by an SRAM element 112 which may be of standard construction having "DATA" and "ENABLE" input terminals and an "OUT" output terminal as is very well known. The SRAM "DATA" input is connected to the DATA addressing line common to each array element in the same column of the array. The SRAM "ENABLE" input is connected to the ENABLE addressing line common to each array element in the same row of the array. The output terminal OUT is connected to the array element electrode 38 thus making electrical connection to the load circuit 40.

The operation of the device according to the fifth embodiment can then be as previously described for any of embodiments 1-4.

An advantage of the fifth embodiment is that the charge sharing problem associated with having a DRAM array element is avoided. This is because the SRAM circuit will act to maintain the voltage at the SRAM output, independently of any change in capacitance at the array element electrode 38. The use of an SRAM array element circuit may therefore facilitate faster droplet movement which may be advantageous to the use of the device in high throughput applications.

A sixth embodiment of the invention is as any of embodiments 1-4 with the additional feature that a global reset is applied to some or all of the array elements in the array immediately before the inversion of the voltage signal applied to the top substrate electrode 28. A graphical representation of the timings and voltage signals according to this embodiment is shown in FIG. 13. The operation is as previously described for the first embodiment of the invention with the additional features that:

(1) Immediately prior to the voltage on the top substrate electrode 28 transitioning from the first reference voltage to the second reference voltage—in the examples transitioning from the low to the high voltage state—(for example after the conclusion of writing frame N of data F1), a "Global All Off" operation is effected whereby the DATA lines of all columns of the array are programmed low and the ENABLE lines of all rows are taken high so as to simultaneously program all array elements to "0". The Global All Off is maintained until the transition of the top substrate electrode 28 voltage is complete.

(2) Immediately prior to the voltage on the top substrate electrode 28 transitioning from the second reference voltage to the first reference voltage—in the examples transitioning from the high to the low voltage state—(for example after the conclusion of writing frame N of data F1B), a "Global All On" operation is effected whereby the DATA lines of all columns of the array are programmed high and the ENABLE lines of all rows are taken high so as to simultaneously program all array elements to "1". The Global All On is maintained until the transition of the top substrate electrode 28 voltage is complete.

The motivation for the inclusion of the additional "Global All Off" and "Global All On" functions is to negate an effect whereby the transition of the voltage signal on the top substrate electrode 28 can parasitically interact with the voltages written to the array element electrodes 38. This parasitic effect can occur in the case where the array element circuit utilizes a DRAM array element circuit 84, for example as shown in FIG. 6.

The operation of the parasitic effect is described as follows by considering operation without either a Global All Off or Global All On operation.

At the point in the timing sequence at which the potential of the top substrate electrode 28 changes, for example when it transitions from first reference voltage to the second reference voltage (eg from $-0.5 \times V_{EW}$ to $+0.5 \times V_{EW}$), there is an accompanying step change in the potential at the array element electrode 38. Since the transistor 110 is turned off, the array element circuit functions as a potential divider and the potential at the array element electrode 38 changes in accordance with the ratio of the total effective capacitance of the load circuit 40 and the value of the capacitor 44. The step change in potential at the array element electrode 38 is retained (ignoring leakage effects through 110) for such a time until the array element is re-written. This parasitic change in the potential of the array element electrode 38 may have an unwanted effect for one or both of the following two reasons:

In the case where the array element electrode 38 is written to $+0.5 \times V_{EW}$, and the transition of the top substrate electrode 28 voltage is from $-0.5 \times V_{EW}$ to $+0.5 \times V_{EW}$, the potential of the array element electrode 38 will increase to a value in excess of $+0.5 \times V_{EW}$. This in turn may result in a voltage in excess of $V_{EW}$ being developed across the terminals of the transistor 110 (for example between the source and the drain, if the DATA line potential is $-0.5 \times V_{EW}$). This may cause problems for the operational reliability of this transistor The voltage perturbation at the array element electrode 38 is a function of the load circuit capacitance present. This will result in the potential of the array element electrode 38 being poorly defined for the period of time between the time of the transition in the potential of the top substrate electrode 28 and the time at which the array element potential is re-written with data. An ill-defined potential may result in unwanted lateral displacement of liquid droplets 4 present on the array.

The inclusion of a Global All On and/or a Global All Off function avoids this parasitic effect by turning on transistor 110 and thus pinning the potential of the array element electrode 38 during the time at which the top substrate electrode 28 changes. The advantage of the sixth embodiment of the invention is thus that the described negative effects of parasitic coupling to the top substrate electrode 28 are avoided. This may result in increased device reliability/ operating lifetime and better control of the position of liquid droplets 4 present on the array.

FIG. 14 shows an example circuit implementation of how the Global All On and Global Off control function may be implemented in the array circuitry. The column driver circuit 78 contains additionally a multiplexer 92 for each column of the array. The multiplexer may be of a standard design as is well known and arranged to operate as follows:

When global input signal ALLOFF=1, the signal written to the column line DATA defaults to the low voltage value $-0.5 \times V_{EW}$.

When global input signal ALLON=1, the signal written to the column line DATA defaults to the high voltage value+ $0.5 \times V_{EW}$.

When both ALLON=0 and ALLOFF=0, the signal written to the column line DATA is in accordance with programmed data as controlled by the column driver circuit 78

The state ALLON=1 and ALLOFF=1 is not allowed

The row driver circuit 76 is also modified by the addition of an OR gate 94 on each of the row ENABLE lines. One input to the OR gate 94 is the output from the row driver circuit 76. The second input of the OR gate 94 is the output signal from an AND gate 120 which consists of the ANDed signal of the ALLON and ALLOFF global signals. The modified row driver circuit operates such that if either ALLON or ALLOFF is high, the output of all of the ENABLE lines is overridden high. The circuit of FIG. 14 thus implements the functionality described by the sixth embodiment of the invention.

It will be apparent that a number of variants of the sixth embodiment exist, whereby the same advantages can be achieved by other means. For example the Global All On/Global All off signals may be arranged to occur immediately after the transition of the voltage on the top substrate electrode 28, thus permitting the perturbation of the potential of the array element electrode 38 and then immediately re-writing it. Alternatively, variants exist using only a Global All On or only a Global All Off function.

A device cross section according to a seventh embodiment of the invention is shown in FIG. 15. This is as the first embodiment, except that the top substrate electrode 28 has been omitted and the reference electrode instead consists of an in-plane counter electrode 31. The in-plane counter electrode 31 may be comprised of the same conductive material used to fabricate the array element electrodes 38. In 2-dimensions, the in-plane counter electrode may consist of a 2-dimensional grid as described in prior art. The in-plane counter electrode 31 may have insulator layer 20 and/or the hydrophobic coating 16 disposed between itself and the liquid droplet 4, as shown in FIG. 15. Alternatively the insulator layer 20 and/or the hydrophobic coating may optionally be removed in the vicinity of the in-plane counter electrode 31. The operation of the device is as described for any of the previous embodiments, with the exception that the electrical signal that was previously described as being applied to the top substrate electrode 28 is instead applied to the in-plane counter electrode 31. The methods of driving and their associated advantages are identical to as previously described. The advantage of this embodiment is that by omitting the top substrate electrode 28, the fabrication and methods of assembly of the device may be simplified.

Optionally, the top substrate 36 may also be omitted entirely, thus realizing an "open" configuration of EWOD device.

According to an eighth embodiment of the invention, the device may also optionally contain a sensor function integrated into each array element. The array element circuit 84 may also optionally contain a sensor function, for example as shown in FIG. 16. The array element circuit 84 contains additional sensor circuitry 109 which may be configured to sense a property of the array element electrode 38, for example the electrical impedance presented at it, or for example the temperature, and to return an output OUT from the array element circuit. The output OUT may further be converted by means of suitable electronic readout circuitry to an output signal for the device as a whole, and the outputs from multiple array elements may be organized on chip and converted to a single serial output for the whole device. FIG. 16 also shows a sensor select input RWS connectable to a sensor row select line which is shared between array element circuits in the same row of the array. The sensor select input RWS is connected to the input of the sensor circuitry 109 via a capacitor 114. A detailed description of example constructions of sensor circuitry 109 and readout circuitry are contained in US application 2012/0007608 which may be considered as being incorporated by reference into the present invention.

The thin film electronics disposed 74 may also be modified as shown in FIG. 17 to contain additional sensor row addressing circuitry 118 and column detection circuitry 86 for the purposes of reading out the measured sensor signal OUT received from the sensor in each array element.

The sensor may, for example, be configured to sense capacitance and thus perform the operations of detecting the presence and size of liquid droplets 4 at each array element location in the electrode array 42. Alternatively the sensor circuit may be configured to sense some other property of the array element electrode 38, for example temperature. For the operation of the device in accordance with this embodiment of the invention, the method of writing a voltage signal to the array element electrode 38 is in accordance with any of the previously described embodiments of the invention, and the sensor operates so as to sense a property of the array element electrode 38, for example the capacitance presented at this node of the circuit.

A ninth embodiment of the invention is as shown in FIG. 18. This embodiment is as any of the previous embodiments, where the reference electrode is partitioned into two or more parts, 28A and 28B which may be driven independently of one another. FIG. 19 shows an example arrangement of the thin film electronics and of the reference electrode (disposed upon the top substrate) according to this embodiment. The reference electrode is disposed upon the top substrate and is portioned into two portions that are independently driven, 28A and 28B. The array elements in rows 1-3 utilize reference electrode 28A. The array elements in rows 4-6 use reference electrode 28B. A graphical representation showing how exemplary data may be written to the array according to this embodiment of the invention is shown in FIG. 20. In frames F1 and F2 the reference electrode 28A controlling rows 1-3 of the array is at one of the first and second reference voltages (for example is at $+0.5 \times V_{EW}$) and the reference electrode 28B controlling rows 4-6 of the array is at the other of the first and second reference voltages (for example is at $-0.5 \times V_{EW}$. The converse is true for frames F1B and F2B. The writing of data to the array is then organized as has been described for previous embodiment. An advantage of the ninth embodiment is that the by par-titioning the reference electrode into multiple sections, the hold time may be made shorter. This in turn facilitates the number of times each frame is re-written may be reduced. This enables higher rates of data input and thus faster movement of droplets.

The ninth embodiment has been described with regard to the case where the reference electrode is formed on the top substrate. However it will be clear to one skilled in the art how the basic concept of the ninth embodiment could equally be combined with the in-plane reference electrode described in the seventh embodiment. A particular advantage of combining a portioned reference electrode with an in-plane reference electrode is that circuitry may be implemented in thin film electronics 74 to control the voltage signals supplied to each partition of the reference electrode 28A, 28B, . . . etc.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

A first aspect of the present invention provides a method of driving an active matrix electro-wetting on dielectric (AM-EWOD) device with an alternating sign of actuation voltage, the AM-EWOD device comprising a plurality of array element electrodes defining respective array elements and a reference electrode. The method comprises (i) setting the reference electrode to a first reference voltage and (ii) writing a set of data to array element electrodes of array elements of the device, whereby an array element is actuated if a first data voltage is written to the corresponding array element electrode to define a voltage difference of magnitude equal to or greater than an actuation voltage and having a first sign across the array element and is non-actuated if a second, different data voltage is written to the corresponding array element electrode. That is, the voltage difference across an array element obtained by applying the first reference voltage to the reference electrode and applying the first data voltage to the array element electrode of the array element is of sufficient magnitude to actuate the array element, whereas the voltage difference across an array element obtained by applying the first reference voltage to the reference electrode and applying the second data voltage to the array element electrode of the array element is not of sufficient magnitude to actuate the array element. The method then comprises (iii) either: (a) maintaining the voltages written to the array element electrodes until a time $t_0$ or (b) re-writing N−1 times (where N≥2) the set of data to the array element electrodes of the array elements.

The method then comprises (iv) setting the reference electrode to a second reference voltage different from the first reference voltage; (v) writing another set of data to array element electrodes of at least some array elements of the device whereby an array element is actuated if a third data voltage is written to the corresponding array element electrode to define a voltage difference of magnitude equal to or greater than the actuation voltage and having a second sign opposite to the first sign across the array element and is non-actuated if a fourth, different data voltage is written to the corresponding array element electrode (that is, the voltage difference across an array element obtained by applying the second reference voltage to the reference electrode and applying the third data voltage to the array element electrode of the array element is of sufficient magnitude to actuate the array element, whereas the voltage difference across an array element obtained by applying the second reference voltage to the reference electrode and applying the fourth data voltage to the array element electrode of the array element is not of sufficient magnitude to actuate the array element); and (vi) either: (a) maintaining the voltages written to the array element electrodes until a time $t_1$ or (b) re-writing M−1 times (where M≥2) the another set of data to the array element electrodes of the at least some array elements.

The values of M and N may or may not be equal to one another.

M and N may each be greater than or equal to 8. In a method of the invention data are written to elements of the array, and are then "held" for a time either by re-writing the data N−1 or M−1 times, or by maintaining the voltages until time $t_0$ or $t_1$. When the data are first written, the finite time required to write each frame of data to the array means there is a delay between the time when the voltage on the reference electrode is transitioned and the time when a given array element is next written with data. During this delay time the voltage across an array element is determined by the "new" voltage applied to the reference electrode and the "old" voltage applied to the array element electrode of the array so that, depending on the data, a given array element may be programmed to an incorrect state. By carrying out the writing process multiple times, or by maintaining the voltages written to the array elements until time $t_0$ or $t_1$, the time for which the correct data values are "held" by the device is increased relative to the time for which incorrect data values may be held and by making the hold time significantly greater than the time for the frame write operation, the time for which an element may be in an incorrect state may be made insignificant in terms of the effect it has on unwantedly perturbing droplet operations.

Similarly, in an embodiment in which the data are "held" by maintaining the voltages written to the array elements until time $t_0$ or $t_1$, the duration of the time for which the voltages are maintained should be significantly greater than the time for the frame write operation; for example, the duration of the time for which the voltages are maintained is preferably at least 7 times the length of time required to write a frame of data to the array.

The second reference voltage may be of opposite sign to the first reference voltage.

The first and second reference voltages may be of equal magnitude to one another.

The magnitude of the first and second reference voltages may be approximately half the magnitude of the actuation voltage.

The first data voltage may have the same magnitude as and may be of opposite sign to the second data voltage.

The first data voltage may have the same magnitude as and may be of opposite sign to the third data voltage.

The first data voltage may have the same magnitude and sign as the fourth data voltage.

The magnitude of the first to fourth data voltages may be approximately half the magnitude of the actuation voltage. Arranging for the magnitude of the first and second reference voltages and for the magnitude of the first to fourth data voltages to be half the magnitude of the actuation voltage ($V_{EW}$) means that an overall voltage across an element of the array that is alternated between $+V_{EW}$ and $-V_{EW}$ may be achieved whilst only requiring a voltage that ranges between $-0.5 \times V_{EW}$ and $+0.5 \times V_{EW}$ to be switched. It will however be understood that in principle the magnitude of the first and second reference voltages and/or the magnitude of the first to fourth data voltages may be greater than half the magnitude of the actuation voltage as this still enables the device to be driven according to the present invention, albeit at the expense of having to switch greater voltages.

The set of data may correspond to a first data frame and the another set of data may correspond to the inverse of the first data frame.

Alternatively, the set of data may correspond to a first data frame for a portion of the device and the another set of data may correspond to the inverse of the first data frame for the portion of the device.

Alternatively, the set of data may correspond to an Nth data frame and the another ste of data may correspond to an (N+1)th data frame.

Alternatively, the set of data may correspond to an Nth data frame and the another set of data may correspond to an inverse of an (N+1)th data frame.

Alternatively, the set of data may correspond to an inverse of an Nth data frame and the another set of data may correspond to a (N+1)th data frame.

Writing the another set of data may comprise writing data only to array elements with data values that change between the Nth data frame and the (N+1)th data frame.

The method may further comprise setting all array elements into the actuated state before (iv) setting the reference electrode to the second reference voltage or further comprising setting all array elements into the non-actuated state before (iv) setting the reference electrode to the second reference voltage.

A second aspect of the invention provides an active matrix electro-wetting on dielectric (AM-EWOD) device comprising:
 a plurality of array element electrodes defining respective array elements;
 a reference electrode;
 array element electrode drive circuits for driving respective array elements;
 a reference electrode drive circuit; and
 controller configured to, in accordance with input data, control the array element electrode drive circuit and the reference electrode drive circuit to perform a method of the first aspect.

The array element drive circuits may comprise:
 a capacitor connected to the array element electrode; and
 a switch connected between a data voltage input and the array element electrode, the switch having a control terminal connected to a control input.

Alternatively, the array element drive circuits may comprise a static random access memory connected between a data voltage input and the array element electrode, the static random access memory having a control terminal connected to a control input.

The invention provides an AM-EWOD device and method of driving that selectively applies an AC voltage to liquid droplets on the array. One example of a method of driving is according to the following sequence:
 (1) The voltage applied to the reference electrode 28 is a first reference voltage, for example at a low level $-0.5 \times V_{EW}$
 (2) A frame of data, such as is desirable to control the potential of to each array element electrode within the array to either $-0.5 \times V_{EW}$ (droplet non-actuated) or $+0.5 \times V_{EW}$ (droplet actuated), is rapidly written to the array (3) There is a hold time during which the reference electrode 28 is maintained static and EITHER
 a. The same data is repeatedly re-written OR
 b. The array is maintained static with the programmed data stored within each array element (4) The voltage applied to the reference electrode 28 is switched to a second, different reference voltage, for example to a high level $+0.5 \times V_{EW}$ (5) Steps (2)~(3) are repeated with an inverted frame of data written to the array, such that $+0.5 \times V_{EW}$ corresponds to the non-actuated state and $-0.5 \times V_{EW}$ to the actuated state. (By an "inverted data frame", also referred to as an "inverse data frame", is meant a data frame in which a given array element is programmed HIGH when in the original data frame F1 it is programmed LOW and vice versa—ie that a given array element is programmed LOW when in the original data frame it is programmed HIGH.)

(6) The voltage applied to the reference electrode 28 is switched to the first reference voltage (that is, to the low level $-0.5 \times V_{EW}$) and the process repeated, with a new frame of data as desired.

According to this method of driving, an electro-wetting voltage of either $+V_{EW}$ or $-V_{EW}$ is maintained across the droplet load circuit 40 when the droplet load circuit is actuated and 0V is maintained when the droplet load circuit 40 is not actuated. Thus an actuation voltage that is alternated between $+V_{EW}$ and $-V_{EW}$ is achieved whilst only requiring a voltage that ranges between $-0.5 \times V_{EW}$ and $+0.5 \times V_{EW}$ to be switched by the TFT circuit elements.

One feature of the described method of driving is that, because of the finite time required to write each frame of data to the array, there is a "delay time" between the time when the voltage on the reference electrode 28 is transitioned and the time when a given array element is next written with data. During this delay time the voltage across an array element is determined by the "new" voltage applied to the reference electrode and the "old" voltage applied to the array element electrode of the array so that, depending on the data, a given array element may be programmed to the "wrong" state. By carrying out the writing process multiple time, or by maintaining the voltages written to the array elements, the time for which the particular data values are "held" by the device is increased and by making the frame write operation take significantly less time than the hold time, the error time may be made insignificant in terms of the effect it has on unwantedly perturbing droplet operations. Typically it is found that the hold time should be ~x8 or more than the time required to write the frame of data.

The implementation of the invention also utilizes the fact that the frame rate which can be supported by the electronics is typically much higher than the data rate written to the array. For example electrical writing of data can typically be at hundreds of frames per second or more, whereas the typical frame rates of data for manipulating fluids are hertz or tens of hertz.

The key advantage of the invention is that an AC method of driving can be implemented in which the electro-wetting voltage is between $+V_{EW}$ and $-V_{EW}$ whilst only requiring a voltage that ranges between $-0.5 \times V_{EW}$ and $+0.5 \times V_{EW}$ to be switched by the TFT circuit elements.

This can be achieved by means of simple array element circuits, for example a simple 1 transistor 1 capacitor (1T1C) array element circuit. The 1T1C array element circuit is much smaller than the array element circuit described in U.S. Pat. No. 8,173,000. This minimizes the physical size of the array element which in turn enables smaller droplets to be created and manipulated. The smaller and simpler array element circuit also improves manufacturing yield and increases the optical transparency of the array element.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

INDUSTRIAL APPLICABILITY

The described embodiments could be used to provide an enhance AM-EWOD device. The AM-EWOD device could form a part of a lab-on-a-chip system. Such devices could be used in manipulating, reacting and sensing chemical, biochemical or physiological materials. Applications include healthcare diagnostic testing, material testing, chemical or biochemical material synthesis, proteomics, tools for research in life sciences and forensic science.

REFERENCE SIGNS LIST

4 liquid droplet
6 contact angle θ
16 First hydrophobic surface
20 Insulator layer
26 Second hydrophobic surface
28 Reference electrode
31 In-plane counter electrode
32 Spacer
34 Non-polar fluid
36 Top substrate
38/38A and 38B Array Element Electrodes
40 Droplet load circuit
42 Electrode array
44 Capacitor
72 Substrate
74 Thin film electronics
76 Row driver circuit
78 Column driver circuit
80 Serial interface
82 Connecting wires
83 Voltage supply interface
84 Array element circuit
86 Column detection circuit
92 Multiplexer
94 OR gate
109 Sensor circuitry
112 SRAM element
114 Capacitor
118 Sensor row addressing circuitry

The invention claimed is:
1. A method of driving an active matrix electro-wetting on dielectric (AM-EWOD) device with an alternating sign of actuation voltage, the AM-EWOD device comprising a plurality of array element electrodes defining respective array elements and a reference electrode, the method comprising:

(i) setting the reference electrode to a first reference voltage;

(ii) writing a set of data to array element electrodes of array elements of the device, whereby an array element is put into an actuated state if a first data voltage is written to the corresponding array element electrode to define a voltage difference of magnitude equal to or greater than an actuation voltage and having a first sign across the array element and is put into a non-actuated state if a second, different data voltage is written to the corresponding array element electrode;

(iii) either:

(a) maintaining the voltages written to the array element electrodes in feature (ii) until a time $t_0$ or (b) re-writing N−1 times (where N≥2) the set of data to the array element electrodes of the array elements;

(iv) setting the reference electrode to a second reference voltage different from the first reference voltage, wherein the second reference voltage is of opposite sign to the first reference voltage;

(v) writing another set of data to array element electrodes of at least some array elements of the device whereby an array element is put into the actuated state if a third data voltage is written to the corresponding array element electrode to define a voltage difference of magnitude equal to or greater than the actuation voltage and having a second sign opposite to the first sign across the array element and is put into the non-actuated state if a fourth, different data voltage is written to the corresponding array element electrode; and (vi) either:

(a) maintaining the voltages written to the array element electrodes element in feature (v) until a time $t_1$ or (b) re-writing M−1 times (where M≥2) the another set of data to the array element electrodes of the at least some array elements.

2. A method as claimed in claim 1 in which the first and second reference voltages are of equal magnitude to one another.

3. A method as claimed in claim 2 in which the magnitude of the first and second reference voltages is approximately half the magnitude of the actuation voltage.

4. A method as claimed in claim 3, in which the first data voltage has the same magnitude as and is of opposite sign to the second data voltage, and in which the magnitude of the first to fourth data voltages is approximately half the magnitude of the actuation voltage.

5. A method as claimed in claim 1 in which the first data voltage has the same magnitude as and is of opposite sign to the second data voltage.

6. A method as claimed in claim 1 in which the first data voltage has the same magnitude as and is of opposite sign to the third data voltage.

7. A method as claimed in claim 1 in which the first data voltage has the same magnitude and sign as the fourth data voltage.

8. A method as claimed in claim 1 wherein the set of data corresponds to a first data frame and the another set of data corresponds to an inverse of the first data frame.

9. A method as claimed in claim 1 wherein the set of data corresponds to a first data frame for a portion of the device and the another set of data corresponds to an inverse of the first data frame for the portion of the device.

10. A method as claimed in claim 1 wherein the set of data corresponds to an Nth data frame and the another set of data corresponds to an (N+1)th data frame or to an inverse of an (N+1)th data frame.

11. A method as claimed in claim 10 wherein writing the another set of data comprising writing data only to array elements with data values that change between the Nth data frame and the (N+1)th data frame.

12. A method as claimed in claim 1 and further comprising setting all array elements into the actuated state before (iv) setting the reference electrode to the second reference voltage or further comprising setting all array elements into the non-actuated state before (iv) setting the reference electrode to the second reference voltage.

13. An active matrix electro-wetting on dielectric (AM-EWOD) device comprising:

a plurality of array element electrodes defining respective array elements;

a reference electrode;

array element electrode drive circuits for driving respective array elements;

a reference electrode drive circuit; and a controller programmed to, in accordance with input data, control the array element electrode drive circuits and the reference electrode drive circuit to perform the method as defined in claim 1.

14. An AM-EWOD device as claimed in claim 13 wherein the array element drive circuits comprise:

a capacitor connected to the array element electrode; and a switch connected between a data voltage input and the array element electrode, the switch having a control terminal connected to a control input.

15. An AM-EWOD device as claimed in claim 13 wherein the array element drive circuits comprise a static random access memory connected between a data voltage input and the array element electrode, the static random access memory having a control terminal connected to a control input.

* * * * *